(12) United States Patent
Kamemura et al.

(10) Patent No.: US 7,286,610 B2
(45) Date of Patent: Oct. 23, 2007

(54) ROADWAY COMMUNICATION SYSTEM

(75) Inventors: Akihiro Kamemura, Osaka (JP);
Tadashi Araki, Osaka (JP); Noriyuki Hirakata, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 489 days.

(21) Appl. No.: 10/811,813

(22) Filed: Mar. 30, 2004

(65) Prior Publication Data

US 2004/0180650 A1    Sep. 16, 2004

Related U.S. Application Data

(62) Division of application No. 09/622,216, filed as application No. PCT/JP99/04314 on Aug. 9, 1999, now Pat. No. 6,744,823.

(30) Foreign Application Priority Data

Dec. 24, 1998  (JP)  ................. 10-367763
Dec. 24, 1998  (JP)  ................. 10-367764
Dec. 24, 1998  (JP)  ................. 10-367765

(51) Int. Cl.
*H04L 1/02*  (2006.01)
*H04B 7/02*  (2006.01)

(52) U.S. Cl. .............. 375/267; 375/347; 375/299; 375/260; 455/101

(58) Field of Classification Search ........ 375/267, 375/347, 299, 260; 455/101, 11.1; 340/905
See application file for complete search history.

(56) References Cited

U.S. PATENT DOCUMENTS

| | | |
|---|---|---|
| 4,182,989 A | 1/1980 | Endo et al. |
| 4,983,984 A | 1/1991 | Shibano et al. |
| 5,192,954 A | 3/1993 | Brockelsby et al. |
| 5,349,360 A | 9/1994 | Matsui |
| 5,369,591 A | 11/1994 | Broxmeyer |
| 5,537,672 A | 7/1996 | Grabow et al. |
| 5,691,727 A | 11/1997 | Cyzs |
| 5,724,666 A | 3/1998 | Dent |
| 5,760,709 A | 6/1998 | Hayashi |

(Continued)

FOREIGN PATENT DOCUMENTS

EP    0 844 801    5/1998

(Continued)

OTHER PUBLICATIONS

Field Trials of Digital Transmission in SFN, ITE Technical Report vol. 20, No. 53, pp. 13-18.

(Continued)

*Primary Examiner*—Phuong Phu
(74) *Attorney, Agent, or Firm*—McDermott Will & Emery LLP

(57) ABSTRACT

Road transmission antennas (4a, 4b) are disposed along a road, each radiating a single cell (E) with electromagnetic waves at the same frequency and of the same content. A vehicle mounted device (3) receiving the waves from the road transmission antennas (4a, 4b) performs antenna pattern diversity reception. When entering a wave blocking area of a large vehicle, a small vehicle is provided with seamless communications with a stationary station.

6 Claims, 28 Drawing Sheets

U.S. PATENT DOCUMENTS

| | | | |
|---|---|---|---|
| 5,847,663 A * | 12/1998 | Chasek | 340/905 |
| 5,983,075 A | 11/1999 | Akutsu | |
| 6,021,166 A | 2/2000 | Suzuki | |
| 6,049,705 A | 4/2000 | Xue | |
| 6,389,263 B1 * | 5/2002 | Schmidt De Andrade | 455/11.1 |

FOREIGN PATENT DOCUMENTS

| | | |
|---|---|---|
| GB | 1 498 388 | 1/1978 |
| JP | 45-882 | 1/1970 |
| JP | 61-216537 | 9/1986 |
| JP | 63-056025 | 3/1988 |
| JP | 63-062423 | 3/1988 |
| JP | 63-233620 | 9/1988 |
| JP | 63-303524 | 12/1988 |
| JP | 2-162929 | 6/1990 |
| JP | 2-186728 | 7/1990 |
| JP | 3-126328 | 5/1991 |
| JP | 04-018824 | 1/1992 |
| JP | 04-255121 | 9/1992 |
| JP | 04-360327 | 12/1992 |
| JP | 05-102894 | 4/1993 |
| JP | 05-307697 | 11/1993 |
| JP | 05-327576 | 12/1993 |
| JP | 6-141361 | 5/1994 |
| JP | 06-350503 | 12/1994 |
| JP | 8-241495 | 9/1996 |
| JP | 09-181699 | 7/1997 |
| JP | 9-284251 | 10/1997 |
| JP | 10-107721 | 4/1998 |
| JP | 10-145273 | 5/1998 |
| JP | 10-256971 | 9/1998 |
| JP | 10-261193 | 9/1998 |
| JP | 11-289285 | 10/1999 |
| WO | WO96/36136 | 11/1996 |

OTHER PUBLICATIONS

Proceedings of The 1997 IEICE General Conference, Mar. 24-27, 1997, Kansai University, Suita.

Feasibility Studies on an Optical Fiber Feeder for Microcelluler Mobile Communication Systems, RCS91-29-33, Sep. 26, 1991.

Liebenow et al., "Investigations of Single Frequency Networks of Digital Mobile Radio Systems based on COFDM", Vehicular Technology Conference, 1998VTC 98. 48th IEEE Ottawa, Ont., Canada May 18-21, 1998, New York, NY USA, IEEE, vol. 3, pp. 2227-2231, XP010288238.

Hunziker et al., "Evaluation of Coding and Modulation Schemes based on Golay Complementary Sequences for Efficient OFDM Transmission", Vehicular Technology Conference, 1998VTC 98. 48th IEEE Ottawa, Ont., Canada May 18-21, 1998, New York, NY USA, IEEE, vol. 2, pp. 1631-1635, XP010287998.

U.S. Office Action, issued in Corresponding U.S. Appl. No. 10/811,901, Dated on Mar. 8, 2007.

* cited by examiner

FIG. 6
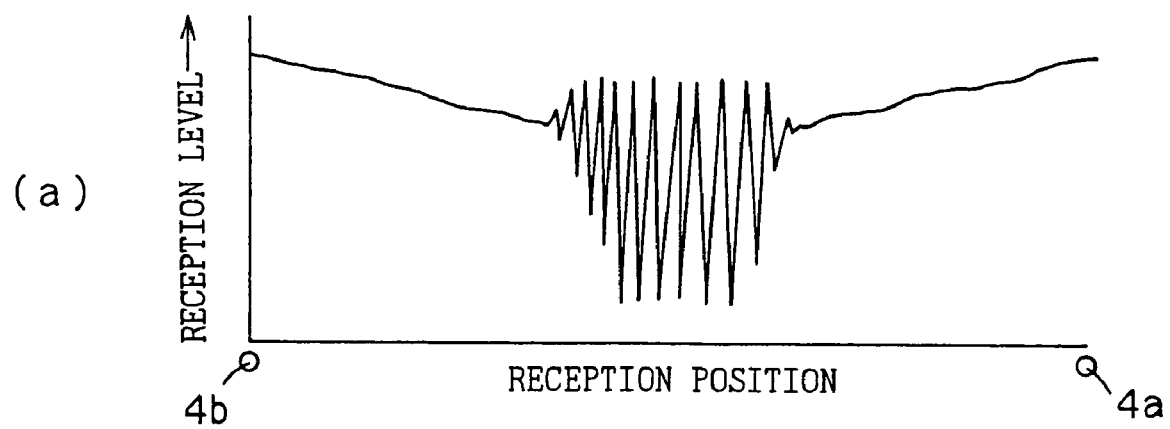
(a)
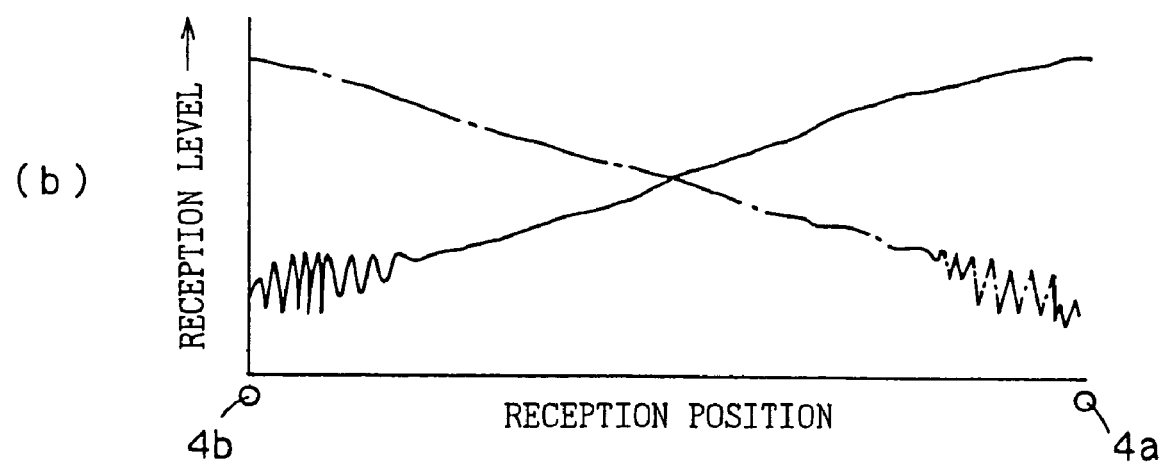
(b)
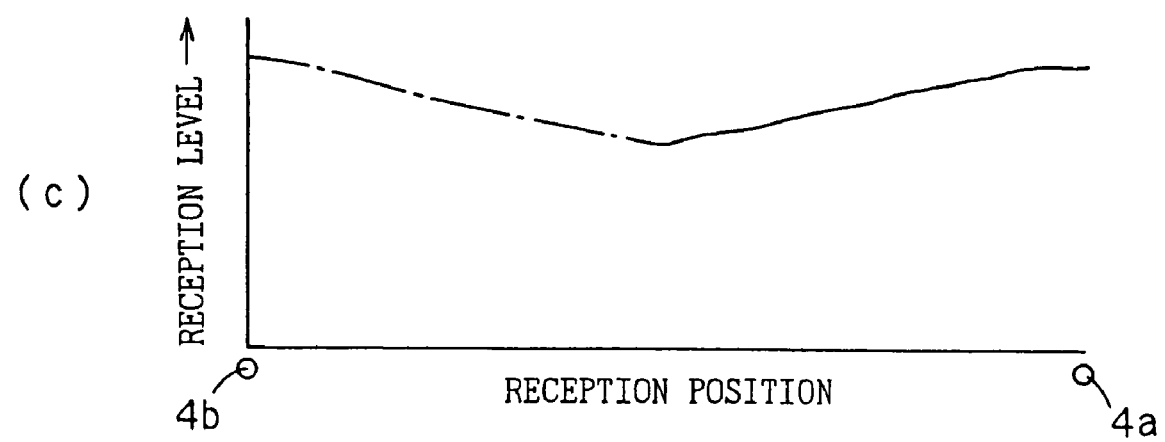
(c)

ROADWAY COMMUNICATION SYSTEM

This application is a divisional of application Ser. No. 09/622,216 filed Aug. 15, 2000 now U.S. Pat. No. 6,744,823, which is a 371 of PCT/JP99/04314, filed Aug. 9, 1999.

FIELD OF THE INVENTION

The present invention is generally related to a roadway communication system wherein a plurality of road antennas are disposed along a road in a manner to define cells on the road, thereby providing mobile communications between a stationary station and a mobile station.

BACKGROUND OF THE INVENTION

Demand for communications between the road administration and ground vehicles tends to grow even more in the future. Particularly, drivers on highways need frequent information exchanges between the stationary station and the mobile stations in order to drive under less load and to prevent accidents. A developed form of such a system is exemplified by an automatic driving system with extensive provision of various sensors and cameras on both the road and vehicle for close communications between the stationary station and vehicle (see, for example, Japanese Unexamined Patent Publication No. 8-241495 (1996).

The consideration of future expansion of the automatic driving system dictates the need to construct a driver support system (hereinafter referred to as "roadway communication system") based on the communications with vehicles. Preparatory to the construction of such a system, communication areas (cells) must be provided over the roads.

It may be contemplated to lay leakage coaxial cables along the roads, which involves a large scale cable-laying work. Besides, the leakage coaxial cables need be embedded at a relatively great depth in the roads and hence, the wave energy presents a disadvantageously small range with respect to a transverse direction of the lane.

In contrast, as shown in FIG. 28, a system with road antennas 120 disposed at given space intervals along the road for communications permits one road antenna 120 to define a relatively broad cell 121. In this case, the road antennas are each connected to a respective control station of the road administration via an optical fiber, coaxial cable or the like.

(A) In a case where the road antennas are disposed, a large vehicle approaching a small vehicle may sometimes cut in a line of sight of the small vehicle. FIG. 29 illustrates a particular state where the small vehicle is in a wave blocking area of the large vehicle. The microwaves and millimeter waves at high frequencies have small diffraction angles and hence, are prone to be blocked. This results in a breakdown of roadway communications.

It is therefore, an object of the invention to provide a roadway communication system accomplishing seamless communications between the stationary station and the mobile station.

(B) The installation of the road antennas generally entails inter-carrier interference or inter-symbol interference associated with the occurrence of delayed multipath waves, causative factors of which are structures near the road or plural vehicles in the cell which reflect the waves. When the inter-symbol interference occurs, a bit error rate is not improved even if the waves are received at high reception levels. This leads to a so-called floor error.

In the mobile communication system based on a single carrier, a receiver is generally equipped with an equalizer having inverse characteristics of those of a transmission line thereby to eliminate the effect of the inter-symbol interference associated with the delayed multipath waves.

Unfortunately, the automobile travels through the cell at such high speeds that the radio frequency energy field presents too sharp fluctuations per unit time for the equalizer to cope with the calculations. Thus, it is impossible to transmit signals at less than a given transmission error rate. Additionally, a large-scale hardware is required for implementing the equalizer, which results in great power consumption.

On this account, the invention has an object to provide a roadway communication system capable of preventing the inter-carrier interference and inter-symbol interference for accomplishing stable communications between the stationary station and the mobile station.

DISCLOSURE OF THE INVENTION (1) A roadway communication system according to the invention for achieving the above object has an arrangement wherein a plurality of road transmission antennas are disposed at different places along a road, each radiating the same cell with electromagnetic waves carried at the same frequency and containing the same content, and wherein a vehicle mounted device receiving the waves from the road transmission antennas performs antenna pattern diversity reception (Claim 1).

According to the invention, the plural road transmission antennas radiate the waves based on signals modulated with data of the same content. In this case, the road transmission antennas each have a specific directivity (including non-directivity) and therefore, the waves from the road transmission antennas are incident on the vehicle along different directions. Accordingly, when an incoming wave in one direction of the vehicle is blocked by a large vehicle, the wave incident on the vehicle in another direction becomes relatively higher in reception level than the blocked wave. Hence, the vehicle reception antennas performing the diversity reception can provide communications between the road transmission antennas and the vehicle mounted device even when one of the waves is blocked.

Within the same cell, seamless communications are ensured between the stationary station and the vehicle because the radiation to the vehicle is provided in plural different directions. This permits every vehicle to receive road traffic information seamlessly and hence, the inventive roadway communication system is best-suited to the automatic driving system, as well.

The diversity reception may be performed based on the reception level of each directive wave received by the vehicle reception antenna (Claim 2).

The reception level of a wave received by the vehicle reception antenna normally increases in value as the vehicle approaches a road transmission antenna radiating the wave. In a case where a wave to be received at the highest reception level is blocked by the large vehicle cutting in the transmission path thereof, for example, a reception level of another wave from a different road transmission antenna may become relatively higher than that of the former wave. In consideration of this event, an arrangement may be made such that the reception levels of the waves received by the vehicle reception antennas are directly detected and the directivity of wave to be received is switched. Thus are attained more preferable communications.

The diversity reception may be accomplished by either of the following operations: (a) an operation of switching or combining the signals which were received by the vehicle reception antennas and are to be decoded; and (b) an operation of switching or combining the codes which were received by the vehicle reception antennas and then decoded (Claim 3).

The vehicle reception antennas may be an array antenna, whereas the vehicle mounted device may further comprise reception-signal detection means for detecting a reception level or phase of the wave received by each of the vehicle reception antennas, so that the diversity reception means may perform the diversity reception using information on the reception level or phase detected by the reception-signal detection means (Claim 4).

This configuration assumes a case where the array antenna or adaptive array antenna is applied to the vehicle reception antennas. The phase control of the antenna provides a desired directivity.

If an optical fiber radio signal transmission system is used as a transmission system for supplying the signals to the transmission antennas (Claim 5), no need exists for each road transmission antenna to have a signal transmission unit with a frequency converter. This results in a simplified configuration of the road transmission antenna.

Orthogonal Frequency Division Multiplex (OFDM) modulation technique in which a guard time is provided at each symbol may be used as a data modulation technique (Claim 6). OFDM system resisting multipath effect is preferably applied to the inventive arrangement wherein the waves incident in different directions are received. Particularly, the provision of the guard time at each symbol is effective to obviate the inter-symbol interference associated with delay in the multipath transmission.

The signal transmission from the plural road transmission antennas to the same cell involves fear that a fractional difference in carrier frequency may occur between the transmission stations. It is known that OFDM is more susceptible to the degradation of transmission quality than other transmission systems. The optical fiber radio signal transmission system provides a highly effective and economical solution to this problem, ensuring that the carrier frequencies from the stations are completely matched.

According to the invention for achieving the above object, a roadway communication system comprises a plurality of road reception antennas for receiving electromagnetic waves radiated from a vehicle mounted device in different directions, the plural road reception antennas being disposed in a manner to provide directivity to the same cell and adapted to perform diversity reception based on the signals received the road reception antennas (Claim 7).

In the roadway communication system, the vehicle radiates the waves in different directions thereby providing data to the stationary station. The plural road reception antennas are so disposed as to provide directivity to the same cell while the site diversity reception is performed using the signals received by the respective road reception antennas. As a result, the stationary station can positively receive the waves despite the multipath effect on the respective radio frequency energy fields of the road reception antennas.

The diversity reception may be performed based on the reception level of the wave received by the road reception antenna (Claim 8).

In a case where a wave to be received at the highest reception level is blocked by the large vehicle cutting in the transmission path thereof, for example, a reception level of another wave from a different road transmission antenna may become relatively higher than that of the former wave. In consideration of this event, an arrangement may be made such that the reception levels of the waves received by the road reception antennas are detected and the reception antenna to receive the wave is changed. Thus are attained more preferable communications.

The diversity reception may be accomplished by either of the following operations: (a) an operation of switching or combining the signals which were received by the road reception antennas and are to be decoded; and (b) an operation of switching or combining the codes which were received by the road reception antennas and then decoded (Claim 9).

If an optical fiber radio signal transmission system is used as a transmission system for receiving the signals from the road reception antennas (Claim 10), no need exists for each road reception antenna to include a signal transmission unit with a frequency converter. This results in a simplified configuration of the road reception antenna.

Orthogonal Frequency Division Multiplex (OFDM) modulation technique may be used as a data modulation technique (Claim 11). OFDM system resisting multipath effect is preferably applied to the inventive arrangement wherein the waves from the vehicle on road are received in an environment having high incidences of wave blocking by other vehicles and wave reflections on surrounding structures. Particularly, the provision of the guard time at each symbol is effective to obviate the inter-symbol interference associated with delay in the multipath transmission.

(2) A roadway communication system according to the invention for achieving the above object has an arrangement wherein a plurality of road transmission antennas are disposed at different places along a road and each radiate the same cell with waves carried at the same frequency and containing the same content, wherein a position marker is disposed at or near the road for indicating a position on the road at which reception levels of the waves radiated from the plural road transmission antennas are switched, and wherein a vehicle mounted device receiving the waves radiated from the road transmission antennas via vehicle reception antennas performs any one of the following operations in response to detection of the position marker at or near the road, the operations including switching of directivities of the vehicle reception antennas, and switching or combining the received signals (Claim 12).

In the roadway communication system, the position marker is disposed at place on the road or the like for indicating the position on the road at which the maximum reception levels are switched. In response to the detection of arrival of the vehicle at the position marker, the directivities of the vehicle reception antennas are switched, or the received signals are switched or combined. Accordingly, the processings become simpler than where the levels of the received signals are detected and compared.

It is noted that "switching the directivities of the vehicle reception antennas using phase control" means reception phase control for directivity change when an array antenna is used as the vehicle reception antennas.

(3) A roadway communication system according to the invention for achieving the above object has an arrangement wherein a plurality of road transmission antennas are disposed at different places along a road, each having a specific polarization characteristic and radiating the same cell with waves carried at the same frequency and containing the same content, and wherein a vehicle mounted device receiving the waves from the road transmission antennas performs polarization diversity reception (Claim 13).

According to the invention, the plural road transmission antennas radiate different polarization waves based on signals modulated with data of the same content. In this case, the differently polarized waves have different propagation characteristics and hence, are generally received by the vehicle on road at different field strengths. Therefore, if a wave of one polarization characteristic is blocked by the large vehicle, the vehicle mounted device is allowed to receive a wave of the other polarization characteristic. By switching the polarization characteristics of the vehicle reception antennas, the seamless communications between the road transmission antennas and the vehicle mounted device are ensured even if the wave incoming from one side is blocked.

The vehicle mounted device may detect reception levels of the waves received by the vehicle reception antennas on a polarization-characteristic basis so as to perform the diversity reception based on the reception level thus detected (Claim 14).

The reception level of the wave received by the vehicle reception antenna normally increases in value as the vehicle approaches the road transmission antenna radiating the wave. In a case where a wave to be received at the highest reception level is blocked by the large vehicle cutting in the transmission path thereof, for example, a reception level of another wave from a different road transmission antenna may become relatively higher than that of the former wave.

In consideration of this event, an arrangement may be made such that the reception levels of the waves received by the vehicle reception antennas are directly detected and the reception polarization characteristic is changed. Thus are attained more preferable communications.

The diversity reception may be accomplished by either of the following operations: an operation of switching or combining the signals which were received by the vehicle reception antennas and are to be decoded; and an operation of switching or combining the codes which were received by the vehicle reception antennas and then decoded (Claim 15).

The vehicle reception antennas may be a polarization array antenna, whereas the vehicle mounted device may further comprise reception-signal detection means for detecting a reception level or phase of the wave received by each of the vehicle reception antennas, so that the diversity reception means may perform the diversity reception using information on the reception level or phase detected by the reception-signal detection means (Claim 16).

This arrangement assumes a case where the array antenna or adaptive array antenna is applied to the vehicle reception antennas. The phase control of the antenna provides reception of a desired polarization wave.

The roadway communication system may further comprise a signal transmission unit for transmitting signals modulated with data of the same content to the road transmission antennas via a plurality of transmission lines, and may use an optical fiber radio signal transmission system as a transmission system for outputting the signals to the plural transmission lines (Claim 17). According to the invention, the signal transmission unit supplies radio frequency signals to the road transmission antennas through the optical fibers and therefore, no need exists for each road transmission antenna to have a signal transmission unit with a frequency converter. This results in a simplified configuration of the road transmission antenna.

Orthogonal Frequency Division Multiplex (OFDM) technique in which a guard time is provided at each symbol may be used as a data modulation technique (Claim 18). OFDM system resisting multipath effect is preferably applied to the inventive arrangement wherein the waves incident in different directions are received. Particularly, the provision of the guard time at each symbol is effective to obviate the intersymbol interference associated with delay in the multipath transmission.

The signal transmission from the plural road transmission antennas to the same cell involves fear that a fractional difference in carrier frequency may occur between the transmission stations. It is known that OFDM is more susceptible to the degradation of transmission quality than other transmission systems. The optical fiber radio signal transmission system provides a highly effective and economical solution to this problem, ensuring that the carrier frequencies from the stations are completely matched.

A roadway communication system according to the invention for achieving the above object comprises a plurality of road reception antennas for receiving differently polarized waves from the vehicle mounted device, and has an arrangement wherein the plural road reception antennas each have a specific polarization characteristic and are so disposed as to provide directivity to the same cell, each performing diversity reception based on the signals received by the road reception antennas (Claim 19).

According to the invention, the vehicle supplies vehicle data to the stationary station. The vehicle mounted device radiates waves of different polarization characteristics via the vehicle transmission antennas. As a result, these waves are received by the road reception antennas. The waves of the different polarization characteristics have different propagation characteristics. Therefore, even if a wave of one polarization characteristic is blocked by the large vehicle, the road reception antenna is allowed to receive a wave of the other polarization characteristic. Thus is ensured the seamless communications between the vehicle mounted device and the road reception antenna.

The roadway communication system may further comprise reception-level detection means for detecting reception levels of the plural road reception antennas on a polarization-characteristic basis, and the diversity reception means may perform the diversity reception based on the reception level detected by the reception-level detection means (Claim 20).

In a case where the large vehicle moves toward a road transmission antenna to receive the polarized waves from the vehicle mounted device at the maximum reception level thereby to block the polarized waves, for example, a reception level of another road reception antenna at a different location may become relatively higher than that of the former reception antenna. In consideration of this event, an arrangement may be made such that the reception levels of the waves received by the road reception antennas are detected and the reception antenna to receive the wave is changed. Thus are attained more preferable communications.

The diversity reception means may perform either of the following operations for diversity reception: an operation of switching or combining the signals received by the road reception antennas; and an operation of switching or combining the codes which were received by the road reception antennas and then decoded (Claim 21).

The roadway communication system may further comprise a signal reception unit for receiving, via transmission lines, the signals received by the road reception antennas, and may use an optical fiber radio signal transmission system as a transmission system for outputting the signals to the transmission lines (Claim 22).

According to the inventive arrangement, the signals received by the road reception antennas may be outputted to the transmission lines as at high frequencies. A signal selection unit may readily compare the received signals at high frequencies. This results in a simplified configuration of the road reception antenna and signal selection unit.

The vehicle mounted device may use orthogonal Frequency Division Multiplex (OFDM) modulation technique, as a data modulation technique, in which a guard time is provided at each symbol (Claim 23).

OFDM system resisting multipath effect is preferably applied to the inventive arrangement wherein the waves from the vehicle on road are received in an environment having high incidences of wave blocking by other vehicles and wave reflections on surrounding structures. Particularly, the provision of the guard time at each symbol is effective to obviate the inter-symbol interference associated with delay in the multipath transmission.

(4) A roadway communication system according to the invention for achieving the above object has an arrangement wherein a plurality of road transmission antennas are disposed at different places along a road, each antenna having a specific polarization characteristic and radiating the same cell with the waves carried at the same frequency and containing the same content, wherein a position marker is disposed at or near the road for indicating a position on the road at which reception levels of the waves from the road transmission antennas are switched, and wherein a vehicle mounted device comprises vehicle reception antennas having different polarization characteristics for receiving the waves radiated from the road transmission antennas, and marker detection means for detecting an arrival of the vehicle at the position marker, and performs any one of the following operations in response to the marker detection means detecting the arrival of the vehicle at the position marker, the operations including the switching of the polarization characteristics of the vehicle reception antennas, the switching of the received signals or codes, or the combining of the received signals or codes (Claim 24).

In the roadway communication system, the road marker is disposed at place, such as on the road, for indicating the position on the road at which the maximum reception levels are switched. In response to the detection of arrival of the vehicle at the position marker, the polarization characteristic of the vehicle reception antenna is changed. Accordingly, the processings become simpler than where the levels of the received signals are detected and compared.

It is noted that "switching the polarization characteristics of the vehicle reception antennas using phase control" means reception phase control for polarization-characteristic change when an array antenna is used as the vehicle reception antennas.

(5) A roadway communication system according to the invention for achieving the above object has an arrangement wherein a plurality of road transmission antennas are disposed at different places along a road and each radiate the same cell with OFDM-modulated waves containing the same content, and wherein a vehicle mounted device receives the waves radiated from the road transmission antennas and demodulates the received waves (Claim 25).

In the roadway communication system, the plural road transmission antennas radiate the waves based on signals OFDM-modulated with data of the same content. In this case, the waves from the road transmission antennas are incident on the vehicle on road along different directions. Therefore, when a wave incoming in one direction is blocked by the large vehicle, the vehicle mounted device is allowed to receive a wave incident thereon in another direction, the reception level of which becomes relatively higher than the former wave. This ensures the seamless communications between the road transmission antennas and the vehicle mounted device.

OFDM system resisting multipath effect is preferably applied to the inventive arrangement wherein the waves from the vehicle on the road are received in an environment having high incidences of wave blocking by other vehicles and wave reflections on surrounding structures. As a result, the communication quality is not degraded.

The roadway communication system of the invention may further comprise a signal transmission unit for transmitting signals modulated with data of the same content via a plurality of transmission lines to the road transmission antennas, and may use an optical fiber radio signal transmission system as a transmission system for outputting the signals to the transmission lines (Claim 26).

In the inventive arrangement, the signal transmission unit supplies the radio frequency signals to the road transmission antennas via the optical fibers and therefore, no need exists for each road transmission antenna to have a signal transmission unit with a frequency converter. This results in a simplified configuration of the road transmission antenna.

It is preferred that Orthogonal Frequency Division Multiplex (OFDM) modulation technique in which a guard time is provided at each symbol is used as a data modulation technique (Claim 27). The provision of the guard time at each symbol is effective to obviate the inter-symbol interference associated with delay in the multipath transmission.

A roadway communication system according to the invention for achieving the above object has an arrangement wherein a vehicle mounted device radiates OFDM-modulated waves via a vehicle transmission antenna, and wherein the plural road reception antennas are disposed at different places along a road as providing directivity to the same cell and each perform demodulation using signals received by the road reception antenna (Claim 28).

According to the invention, the vehicle supplies the vehicle data to the stationary station. In this case, the vehicle mounted device radiates the waves via the vehicle transmission antenna while the reception levels of the road reception antennas are affected by the multipath transmission. The invention employs the plural road reception antennas and OFDM system resisting multipath effect, thereby ensuring positive wave reception on the stationary station side and error-free data recovery.

In the roadway communication system, the road reception antennas may use an optical fiber radio signal transmission system for outputting the received signals to transmission lines to the road reception means (Claim 29). According to the inventive arrangement, the road transmission antennas supply the radio frequency signals to the road reception means via the optical fibers and therefore, no need exists for each road reception antenna to have a signal transmission unit with a frequency converter. This results in a simplified configuration of the road reception antenna.

The vehicle mounted device may use OFDM modulation technique, as a data modulation technique, in which a guard time is provided at each symbol (Claim 30). The provision of the guard time at each symbol is effective to obviate the inter-symbol interference associated with delay in the multipath transmission.

(6) The roadway communication system according to the invention for achieving the above object has an arrangement wherein the plural road transmission antennas each define an individual one of plural sub-areas which are constituting a single cell (Claim 31).

According to the invention, the waves modulated with road traffic data of the same content are individually incident on the respective sub-areas so that the incoming direction of the wave changes each time the vehicle transfers to the next sub-area. Accordingly, if the wave is blocked in one area, the vehicle moving to the next sub-area is allowed to receive the wave. This prevents the occurrence of a communication breakdown between the vehicle and the stationary station, ensuring the seamless communications.

Since the sub-area defined by each road transmission antenna is one fraction of a single cell, the road transmission antenna requires a small transmission power. This results in reduced cost for the road antennas.

In the case where the sub-areas are defined, as well, the waves of the same frequency are simultaneously incident on the vehicle mounted device along different directions. Accordingly, it is preferred for the vehicle mounted device to select the wave of the maximum reception level in order to avoid the fading effect.

(7) The roadway communication system according to the invention for achieving the above object has an arrangement wherein communications are carried out over a plurality of continuous cells, using signals at the same frequency and of the same content (Claim 32).

This arrangement provides the vehicle mounted device with the seamless communications free from frequency switching (handover) during the travel of the vehicle, also contributing to a simplified configuration of the vehicle mounted device.

(8) The roadway communication system according to the invention for achieving the above object has an arrangement wherein the plural road transmission/reception antennas are disposed near a cell boundary with respect to a longitudinal direction of the road (Claim 33).

In this arrangement, the road transmission antenna is located near a road transmission antenna of a neighboring cell and hence, the waves radiated from these transmission antennas are incident on the vehicle on road along different directions.

BRIEF DESCRIPTION OF THE DRAWINGS

FIG. 6 is a group of graphical representations of reception levels of electromagnetic waves;

BEST MODE FOR CARRYING OUT THE INVENTION

FIRST EMBODIMENT(Directivity)

Figure 1:
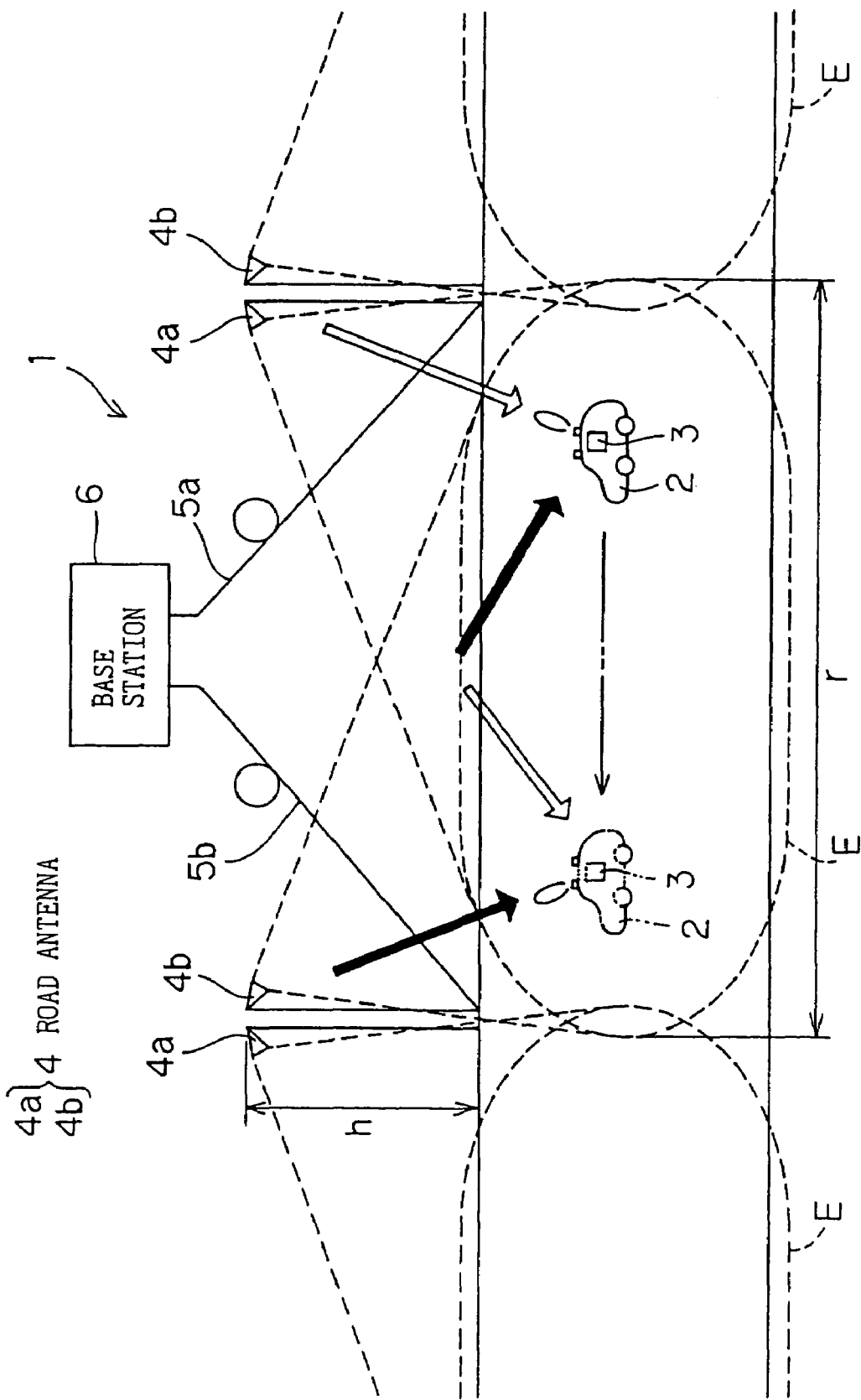
FIG. 1 is a conceptual representation of an arrangement of a roadway communication system according to a first embodiment of the invention.

FIG. 1 is a conceptual representation of an arrangement of a roadway communication system according to a first embodiment of the invention. The roadway communication system provides two-way communications between a stationary station 1 and a vehicle mounted device 3 on a vehicle 2.

In the stationary station 1, a plurality of cells E are continuously defined along a road. Near a boundary of individual cells E with respect to a longitudinal direction of the road, a first road antenna 4a and a second road antenna 4b are installed, each having a directivity toward each cell. The first and second road antennas 41, 4b each radiate the cell E with electromagnetic waves of the same frequency (e.g., in 6 GHz band). More specifically, the first road antenna 4a provides radiation in a direction represented by the hollow arrow in the figure whereas the second road antenna 4b provides radiation in a direction represented by the solid arrow. Accordingly, the electromagnetic waves of the same frequency are incident on any point in the cell E in longitudinally forward and backward directions with respect to the road. Hence, when passing through the cell E, the vehicle 2 receives the electromagnetic waves incoming from front and from back.

It is noted that the road antenna 4 has a height above the ground "h" of, for example, 10 m whereas the cell E has a longitudinal length "r" of, for example, 100 m with respect to the road.

The two road antennas 4a, 4b are connected to a base station 6 via optical fibers 5a, 5b, respectively. Each optical fiber 5a, 5b comprises an up-cable and a down-cable. The optical fibers reduce signal attenuation as compared with a coaxial cable or the like used as the transmission line and hence, the degradation of communication quality is prevented. As a matter of course, the optical fibers 5a, 5b may be replaced by the coaxial cable.

The base station 6 modulates a signal using road traffic information and applies the resultant signal to the respective road antennas 4a, 4b via the optical fibers 5a, 5b. Accordingly, the waves radiated from the road antennas contain the same road traffic information.

The base station 6 receives vehicle data from the respective road antennas 4a, 4b so as to perform suitable processings on the data. The vehicle data (including vehicle ID data item and other data items on road conditions detected by various unillustrated sensors) are obtained by the vehicle mounted device 3 and sent therefrom via the road antennas.

Figure 2:
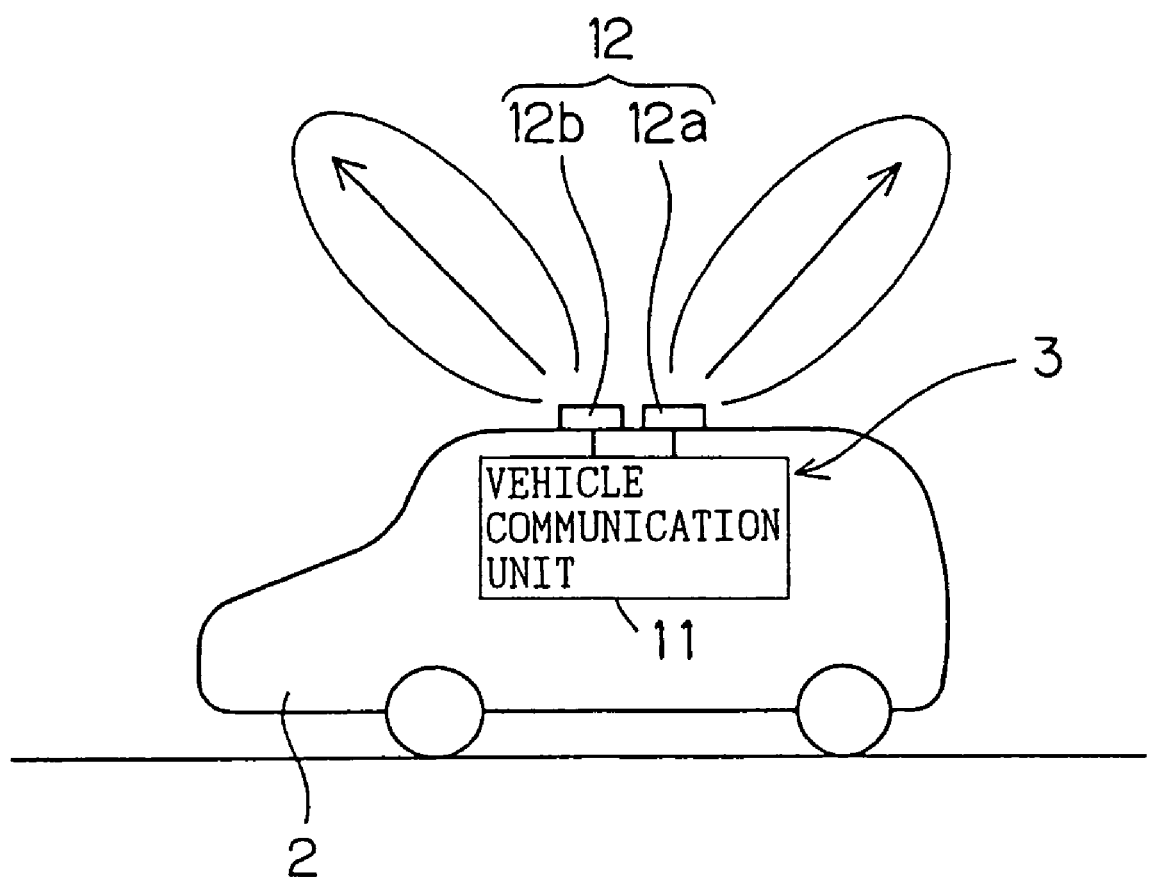
FIG. 2 is a conceptual representation of an arrangement of a vehicle mounted device.

FIG. 2 is a conceptual representation of an arrangement of the vehicle mounted device 3. The vehicle mounted device 3 includes a vehicle communication unit 11 and an vehicle antenna unit 12. The vehicle communication unit 11 operates to radiate electromagnetic waves containing the vehicle data via the vehicle antenna unit 12. The vehicle communication unit 11 also obtains the road traffic data contained in the waves radiated from the respective road antennas 4a, 4b and received by the vehicle antenna unit 12. The road traffic data thus obtained are supplied to a driver, for example.

The vehicle antenna unit 12 includes a pair of vehicle antennas 12a, 12b mounted on a ceiling of the vehicle 2. The vehicle antennas 12a, 12b are juxtaposed along an anteroposterior direction of the vehicle 2, each having a directivity along the anteroposterior direction of the vehicle 2. This permits the vehicle antennas 12a, 12b to receive high level radiation from the road antennas 4a, 4b providing directivities thereto, respectively. On the other hand, the vehicle antennas 12a, 12b direct their radiations containing the vehicle data to the road antennas 4a, 4b.

Figure 3:
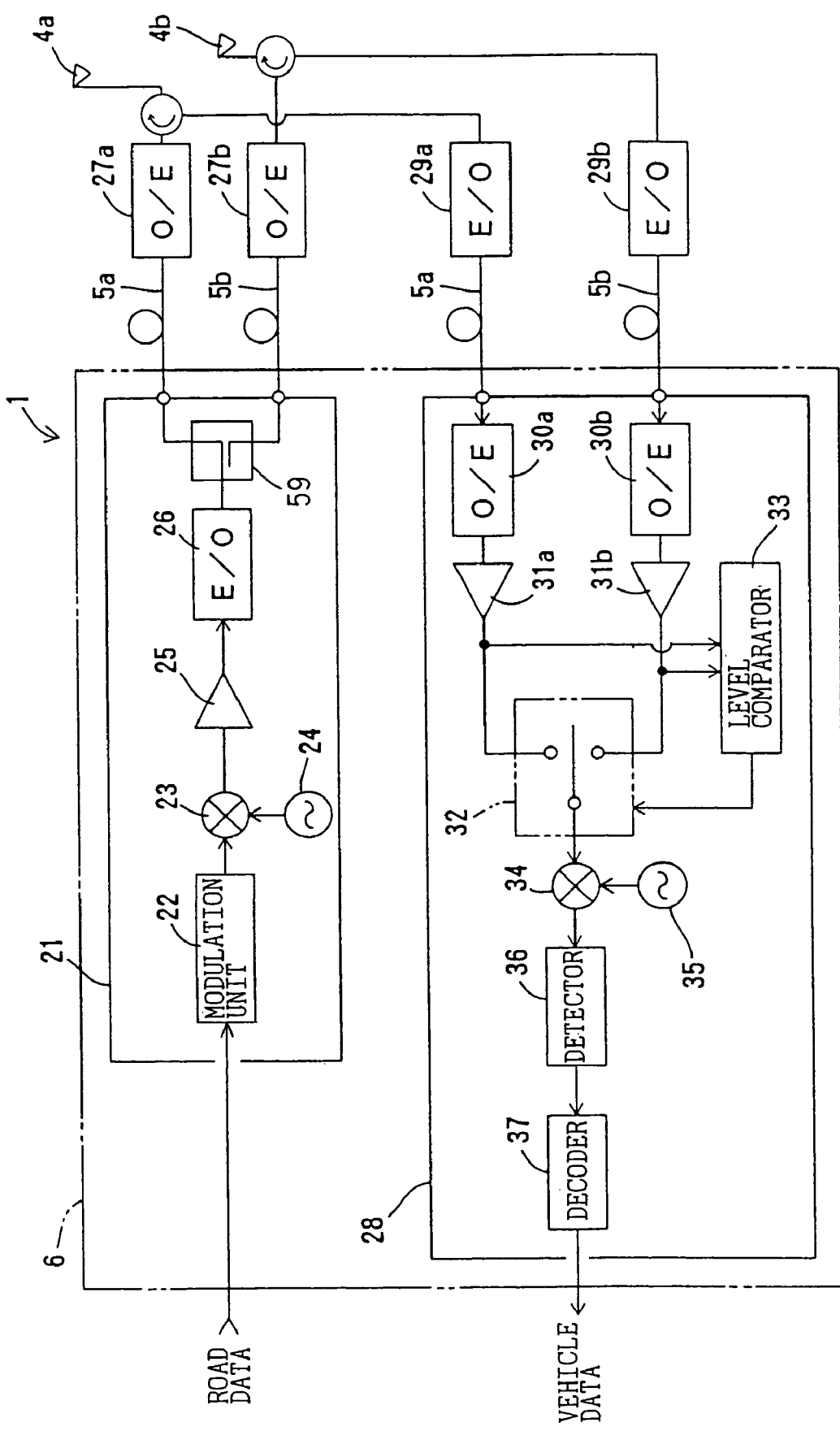
FIG. 3 is a block diagram illustrating an exemplary electrical configuration of a stationary station.

FIG. 3 is a block diagram illustrating an electrical configuration of the stationary station 1. The base station 6 includes a transmission unit 21 for supplying the road traffic data to the road antenna 4. The transmission unit 21 includes a modulation unit 22 modulating a modulation-carrier based on the road traffic data for generation of a transmission signal. The modulation unit 22 may employ QPSK as a suitable modulation technique but other modulation techniques such as QAM, BPSK, 8PSK and the like are applicable. Unless otherwise noted, the description herein is made on assumption that QPSK modulation is used.

The transmission signal is supplied to a mixer 23, which generates a radio-transmission signal of 6 (GHz) band, for example, by combining the transmission signal with a frequency-modulation carrier from a local oscillator 24. The radio transmission signal is amplified in a high-frequency amplifier 25 and then supplied to an electro-optical converter (E/O) 26 for direct conversion to an optical signal. The resultant optical signal is outputted to the two up-optical cables 5a, 5b. The optical signal is delivered to optic-electrical converters (O/E) 27a, 27b mounted to the respective road antennas 4a, 4b, where it is converted back to the electrical signal for radiation via the road antennas 4a, 4b.

When outputted to the optical fibers 5a, 5b, the optical signal converted by the electro-optical converter (E/O) 26 must be distributed. An optical fiber coupler 59 is used for the distribution of the optical signals. The optical fiber coupler 59 of the known configuration is usable (for example, C-NS series commercially available from Fiber Optic Communications Inc.).

The control station 6 further includes a reception unit 28 for obtaining the vehicle data from the road antennas 4a, 4b. When the road antennas 4a, 4b receive the electromagnetic waves from the vehicle antennas 12a, 12b, the reception signals corresponding to the waves are converted to optical signals by electro-optical converters (E/O) 29a, 29b. Subsequently, the resultant optical signals are outputted to two down-cables 5a, 5b to be supplied to the reception unit 28 of the base station 6.

The reception unit 28 includes two optic-electrical converters (O/E) 30a, 30b which convert the optical signals back to the original reception signals. The reception signals are amplified in high-frequency amplifiers 31a, 31b, respectively and then supplied to a switch unit 32, such as comprised of a semiconductor switch. The amplified reception signals are also applied to a level comparator 33. The level comparator 33 compares reception levels of the respective reception signals to determine which of the reception signals is the higher. Then the level comparator provides control of the switch unit 32 for passage of a reception signal of the maximum reception level.

In the configuration of FIG. 3, two signals are switched by the switch unit 32. However, an alternative configuration may be made such that the two signals are weighted with a predetermined weighting factor and then combined. In this case, "the predetermined weighting factor" is determined based on the reception levels of the reception signals compared by the level comparator 33.

According to the block diagram of FIG. 3, the switch unit 32 operates to switch the high-frequency signals amplified by the high-frequency amplifiers 31a, 31b. An alternative configuration is possible wherein data detected by a detector 36 are switched or combined. Another configuration is also possible wherein data decoded by a decoder 37 are switched or combined.

Figure 4:
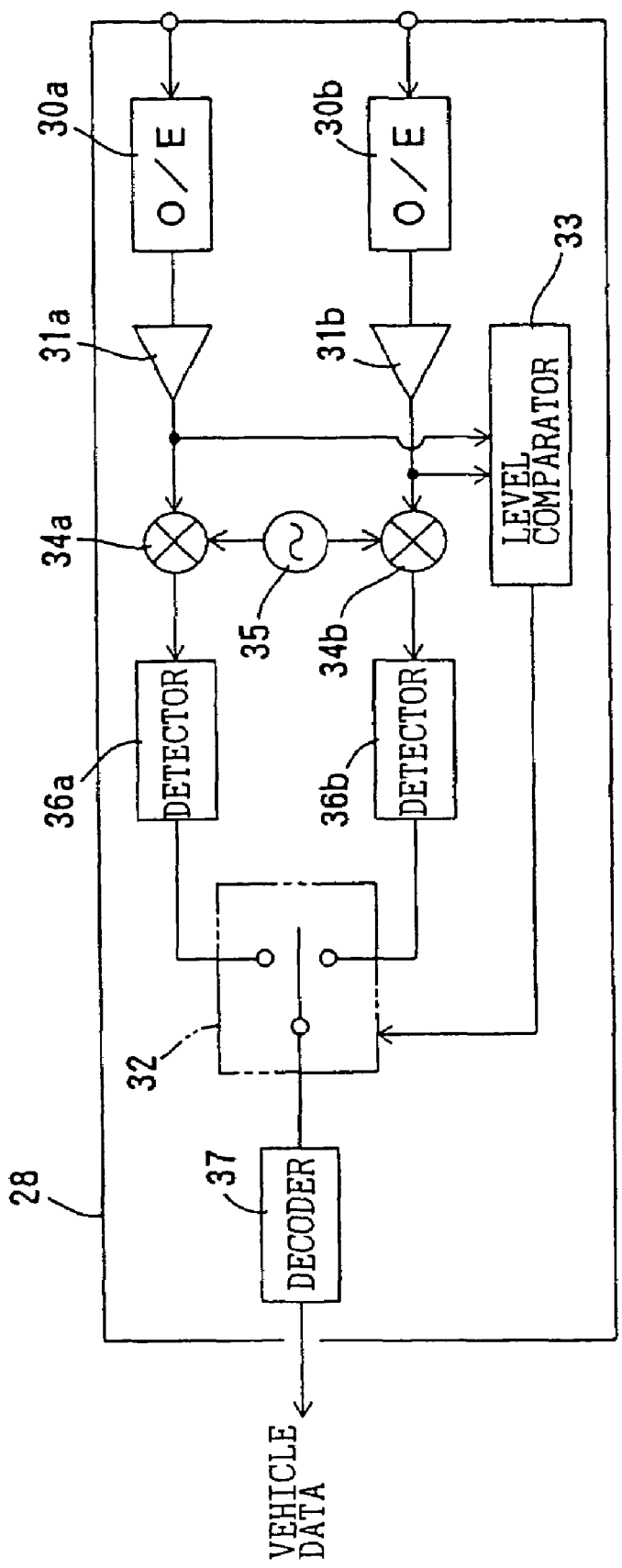
FIG. 4 is a block diagram illustrating another exemplary electrical configuration of a reception unit in a base station.

FIG. 4 illustrates a configuration wherein the switch unit 32 is disposed downstream of the detector so as to select a reception signal to be passed from reception signals subjected to coherent detection. More specifically, the reception signals amplified by high-frequency amplifiers 31a, 31b are applied to mixers 34a, 34b to be changed in frequency. The resultant signals are subject to coherent detection in detectors 36a, 36b and then supplied to the switch unit 32. On the other hand, the level comparator 33 provides control of the switch unit 32 for selective passage of a reception signal of the highest reception level out of the reception signals amplified by the high-frequency amplifiers 31a, 31b.

The selection of the reception signal subsequent to the detection advantageously provides signals less susceptible to noises, or signal quality deterioration.

Figure 5:
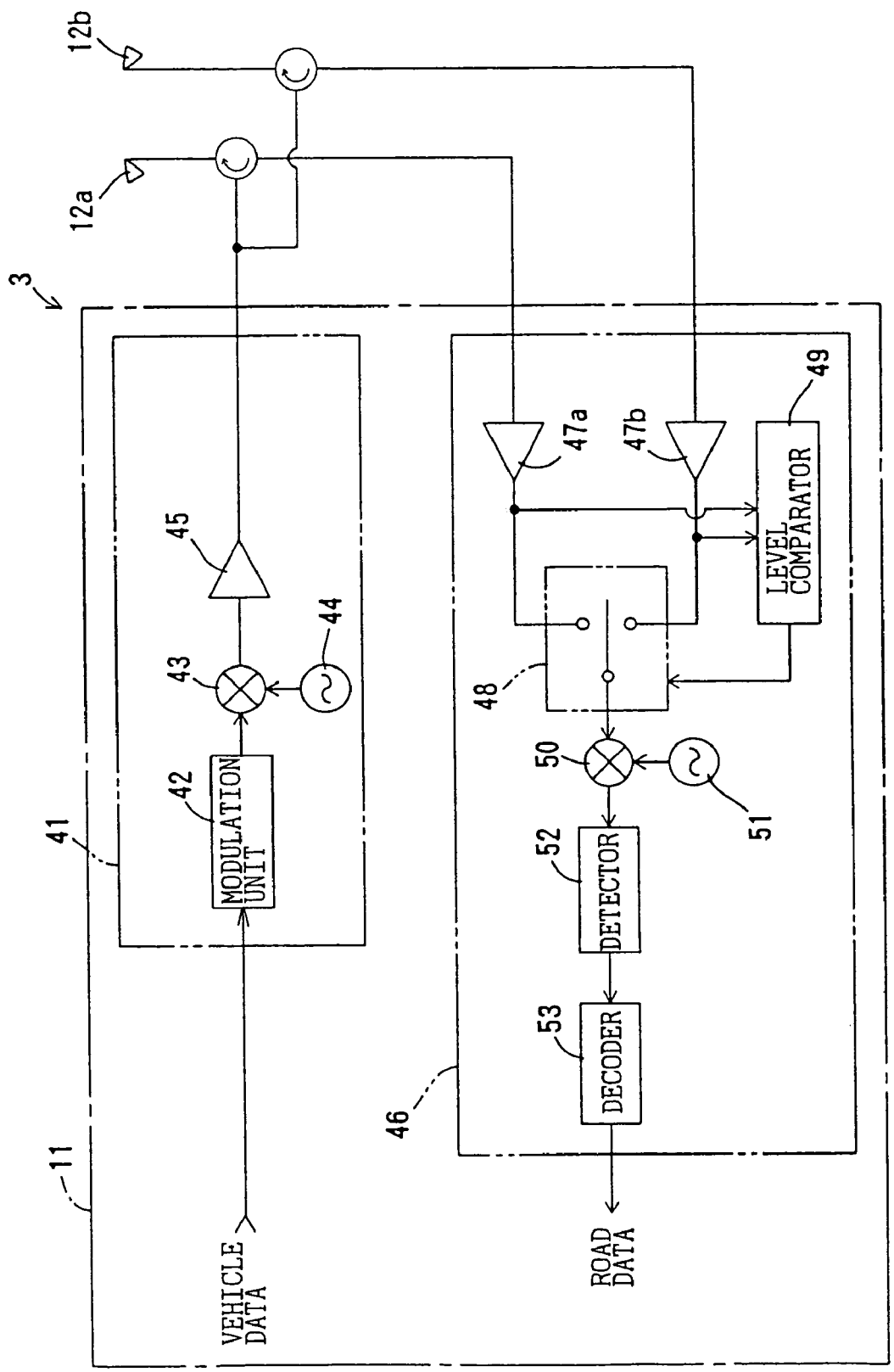
FIG. 5 is a block diagram illustrating an exemplary electrical configuration of the vehicle mounted device.

The configuration where the selection of reception signal follows the signal detection may be applied to a reception unit 46 of the vehicle communication unit 11 shown in FIG. 5.

As described with reference to FIGS. 3 and 4, a so-called optical fiber radio signal transmission technique (A. J. Cooper, "FIBER/RADIO FOR THE PROVISION OF CORDLESS/MOBILE TELEPHONY SERVICES IN THE ACCESS NETWORK", Electron.Lett., Vol.26, No.24 (November 1990) is used as a transmission technique for outputting the optical signal to the optical fibers 5a, 5b.

This negates the need for mounting a transmission/reception unit to the respective road antennas 4a, 4, permitting the transmission/reception units for the antennas to take form as one set mounted to the base station 6. Thus, the road antennas 4a, 4b may be constructed simple. On the other hand, the base station 6 may process the reception signals fed from the road antennas 4a, 4b as they are at high frequencies. Hence, the level comparator 33 may readily compare the high-frequency reception levels of the reception signals. This results in a simplified structure of the reception unit 28.

The base station 6 selects the reception signal based on a so-called site diversity system thereby accomplishing an accurate decoding of the vehicle data in the subsequent processing.

In FIG. 3, the reception signal through the switch unit 32 goes to a mixer 34 where it is combined with a frequency-modulation carrier outputted from a local oscillator 35 to be changed in frequency. Subsequently, the resultant signal is applied to the detector 36 to be coherently detected using a demodulation carrier. Then, the signal is applied to the decoder 37 for conversion to a reception signal corresponding to the vehicle data.

In order for the vehicle mounted device 3 to accomplish accurate decoding of the road traffic data, transmission data bits corresponding to the radiated waves from the road antennas 4a, 4b must be in synchronism. Where the phase modulation technique, such as QPSK, is used for modulation, any frequency difference between the radiated waves from the road antennas will entail abnormal operations of an AFC, resulting in bit errors (see, for example, YOICHI SAITOH, "MODULATION/DEMODULATION IN DIGITAL RADIO COMMUNICATIONS", Electronic Information Communication Association, p.119, 1.10-18). Too great frequency difference disables the coherent detection and the encoded signals cannot be decoded at all.

In the stationary station 1, however, the high-frequency signals generated in the base station 6 are distributed to the road antennas 4a, 4b via the optical fibers 5a, 5b and therefore, no difference occurs between the radiated waves from the antennas 4a, 4b. By eliminating delay difference between the optical fibers 5a, 5b, the transmission bits may readily be synchronized.

The characteristic of producing no frequency difference is effectively exhibited by applying OFDM (Orthogonal Frequency Division Multiplex), as modulation technique, to the modulation unit 22. OFDM is a modulation system wherein data is divided and multiplexed using multiple carriers orthogonal to each other. OFDM arranges carrier frequencies at such narrow intervals that any frequency shift will cause inter-carrier interference, leading to serious deterioration of communication quality. Such a drawback may be eliminated by the optical fiber radio signal transmission system employing the optical fiber coupler 59 for signal distribution because in principle, the carriers radiated from the antennas 4a, 4b have the same frequency. Thus, the present roadway communication system is provided with the greatest possible merit of OFDM which is less susceptible to multipath interference.

FIG. 5 is a block diagram illustrating an electrical configuration of the vehicle mounted device 3. The vehicle communication unit 11 includes a transmission unit 41 for supplying the vehicle data to the stationary station 1. The transmission unit 41 includes a modulation unit 42 which modulates a modulation-carrier based on the vehicle data for generating a transmission signal. A suitable modulation technique is exemplified by QPSK and the like.

The transmission signal is supplied to a mixer 43 where it is combined with a frequency-modulation carrier outputted from a local oscillator 44, thus converted to a radio transmission signal. The transmission signal is amplified by a high-frequency amplifier 45 and then supplied to the vehicle antennas 12a, 12b to be radiated therefrom as electromagnetic waves.

The vehicle communication unit 11 further includes the reception unit 46 for obtaining the road traffic data from the road antennas 4a, 4b. When the vehicle antennas 12a, 12b receive the radiations from the road antennas 4a, 4b, reception signals corresponding to the received waves are applied to the vehicle communication unit 11. The reception signals are then amplified in high-frequency amplifiers 47a, 47b so as to be supplied to a switch unit 48 such as comprised of a semiconductor switch. The amplified signals are also applied to a level comparator 49 which, in turn, compares the reception levels of the reception signals thereby to determine which of the signals has the higher reception level. Subsequently, the comparator provides control of the switch unit 48 for passage of the reception signal of the highest reception level.

In the block diagram of FIG. 5, the two signals are switched by the switch unit 48. However, an alternative configuration is possible wherein the two signals are weighted with a predetermined weighting factor and then combined. In this case, "the predetermined weighting factor" is determined based on the reception levels of the reception signals compared by the level comparator 48.

In the configuration of the block diagram of FIG. 5, the switch unit 48 switch the high-frequency signals amplified by the high-frequency amplifiers 47a, 47b. However, an alternative configuration may be made such that data detected by a detector 52 are switched or combined. Otherwise, data decoded by a decoder 53 may be switched or combined.

Since the reception unit 46 of the vehicle communication unit 11 is adapted to select reception signal based on a so-called antenna pattern diversity system, the vehicle data are accurately restored in the subsequent step.

The reception signals through the switch unit 48 are applied to a mixer 50 where they are combined with a frequency-conversion carrier outputted from a local oscillator for frequency conversion. Subsequently, the resultant signals are supplied to the detector 52 for coherent detection using a demodulation carrier. Then, the signals are applied to the decoder 53 which converts the reception codes to signals corresponding to the road traffic data.

Next, the effect of diversity reception will be described. In the vehicle mounted device 3, a so-called multipath environment is established because the electromagnetic waves at the same frequency are incident along forward and backward directions of the vehicle 2. In the case of the conventional signal reception using a single antenna, the reception signals suffer fading with the sharp fluctuations in amplitude and phase, as shown in FIG. 6a.

Depending upon the position of the vehicle 2, there may be a difference between a vehicle-to-antenna 4a distance and a vehicle-to-antenna 4b distance and hence, which leads to propagation time delay difference between signals received by the vehicle mounted device 3. The propagation time delay difference results in the inter-symbol interference. Consequently, the so-called floor error occurs because the bit error rate is not improved despite the high reception level of the received waves. The effect is particularly noticeable in a case where the base station 6 has such a low modulation rate that the propagation time delay difference becomes significant relative to one bit time.

Assume, for example, that the cell E is 100 m in longitudinal length along the road and the road antenna 4a is 10 m in height, a maximum value of the delay spread between the reception signals from the respective road antennas 4a, 4b (standard deviation of time delay weighted with the reception level) is at about 50 nsec. If, in this case, the vehicle mounted device 3 uses QPSK coherent detection, as a detection technique, the floor error rate is at about $6 \times 10^{-4}$ with the modulation rate of 1 Mbit/sec (see, for example, SHINSI MASAAKI "RADIO WAVE PROPAGATION IN RADIO COMMUNICATIONS", Electronic Information Communication Association, p.213 Feb.20, 1994).

On the other hand, FIG. 6b represents the levels of decomposed waves received from the respective road antennas 4a, 4b. In FIG. 6b, the solid line indicates the level of wave received from the first road antenna 4a whereas the two-dot-dash line indicates the level of wave received from the second road antenna 4b. FIG. 6b shows that relatively stable reception signals can be obtained by selecting either one of the waves that has the maximum reception level.

Accordingly, the vehicle mounted device 3 of the first embodiment is designed to select either one of the reception signals that corresponds to the maximum reception level based on the different directivities of the antennas and to subject the signals thus received to the detection and decoding processes. This reduces the inter-wave interference so that the vehicle mounted device 3 can receive the waves at levels as shown in FIG. 6c. Thus is obviated the effect of the multipath fading. In the selection of either one of the reception signals, if the unselected reception signal has a level somewhat lower than that of the selected reception signal, the floor error rate may be improved. More specifically, if the level of the unselected reception signal is about 20 db lower than that of the selected reception signal, the floor error rate is improved to about $1 \times 10^{-5}$ with the delay spread decreased to about 1/10.

Figure 7:
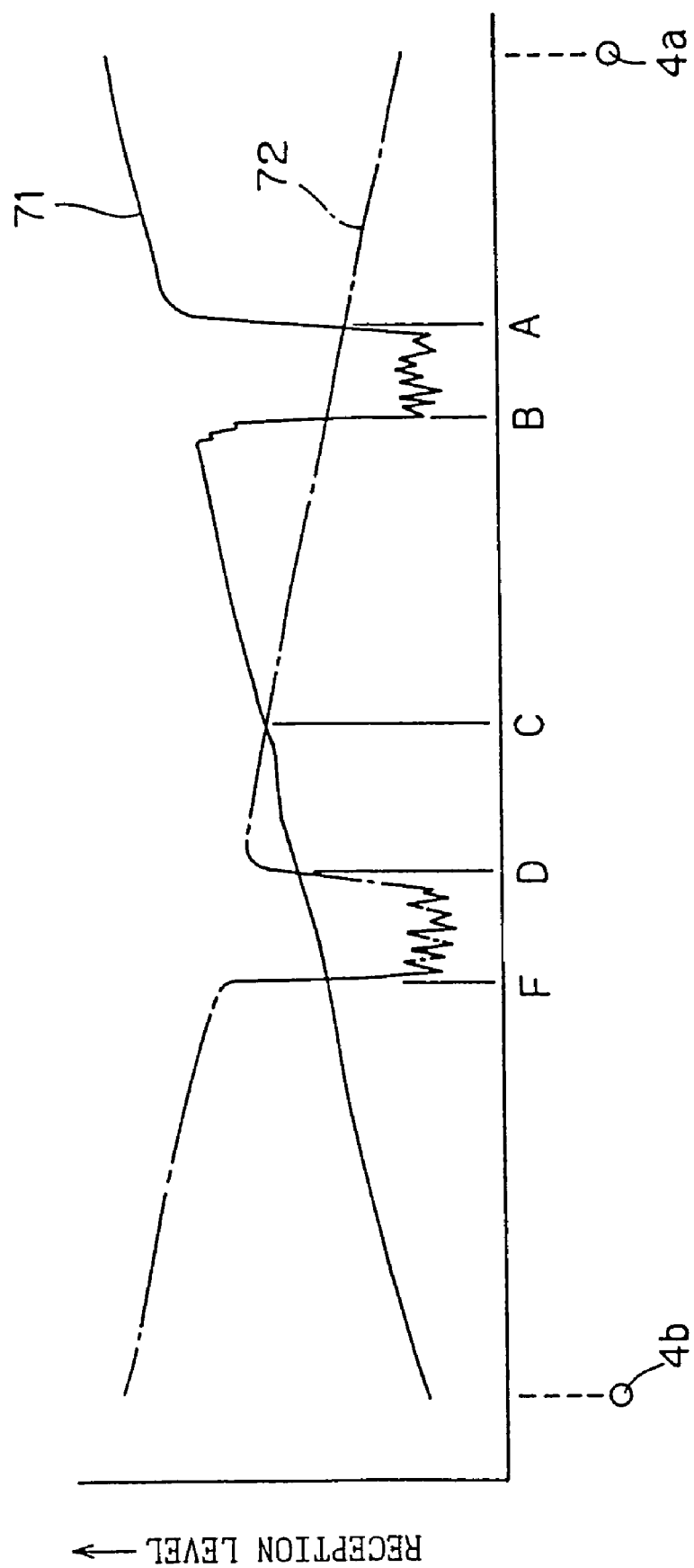
FIG. 7 is a graphical representation explanatory of a selection procedure of a reception level and a reception signal.

FIG. 7 is an explanatory diagram of a reception signal selection procedure taken by the vehicle mounted device 3. In FIG. 7, sections A-B and D-F each indicate a wave blocking area produced by a large vehicle traveling in side-by-side relation to the vehicle.

When the vehicle is traveling in proximity of the first road antenna 4a (at position indicated by the solid line in FIG. 1), a reception level 71 of the radiation from the first road antenna 4a is higher than a reception level 72 of that from the second road antenna 4b. Hence, a reception signal corresponding to the radiation from the first road antenna 4a is selected.

When, in this state, the vehicle 2 reaches a point A to have the radiation thereto blocked by the large vehicle, the reception level 71 drops abruptly. At this time, the vehicle mounted-device 3 also receives the radiation from the second road antenna 4b so that the reception level 72 becomes relatively higher than that of the radiation from the first road antenna. Thus, the vehicle mounted device 3 selects the reception signal corresponding to the radiation from the second road antenna 4b. Subsequently, when the vehicle 2 reaches a point B getting out of the wave blocking area, the reception level 71 becomes relatively higher and therefore, the vehicle mounted device 3 selects the reception signal corresponding to the radiation from the first road antenna 4a.

After the vehicle 2 passes a midportion C of the cell E (at position indicated by the two-dot-dash line in FIG. 1), the relation between the reception levels 71 and 72 is inverted so that the reception level 72 is relatively the higher. Therefore, the vehicle mounted device 3 selects the reception signal corresponding to the radiation from the second road antenna 4b. In the wave blocking section between points D and F, the reception level 71 is relatively the higher during a period that the vehicle 2 travels between the points D and F. Hence, the vehicle mounted device 3 selects the reception signal corresponding to the radiation from the first road antenna 4a.

As mentioned supra, the first embodiment provides a single cell E with two propagation paths for the waves radiated from the road antenna 4. Therefore, the blocking of the waves is prevented even when the vehicle 2 is traveling near the large vehicle such as a truck. In addition, the effect of multipath interference may be obviated because the vehicle mounted device 3 selectively processes the reception signal of the maximum reception level. As a result, seamless communications take place preferably between the vehicle mounted device 3 and the road antenna 4.

Figure 8:
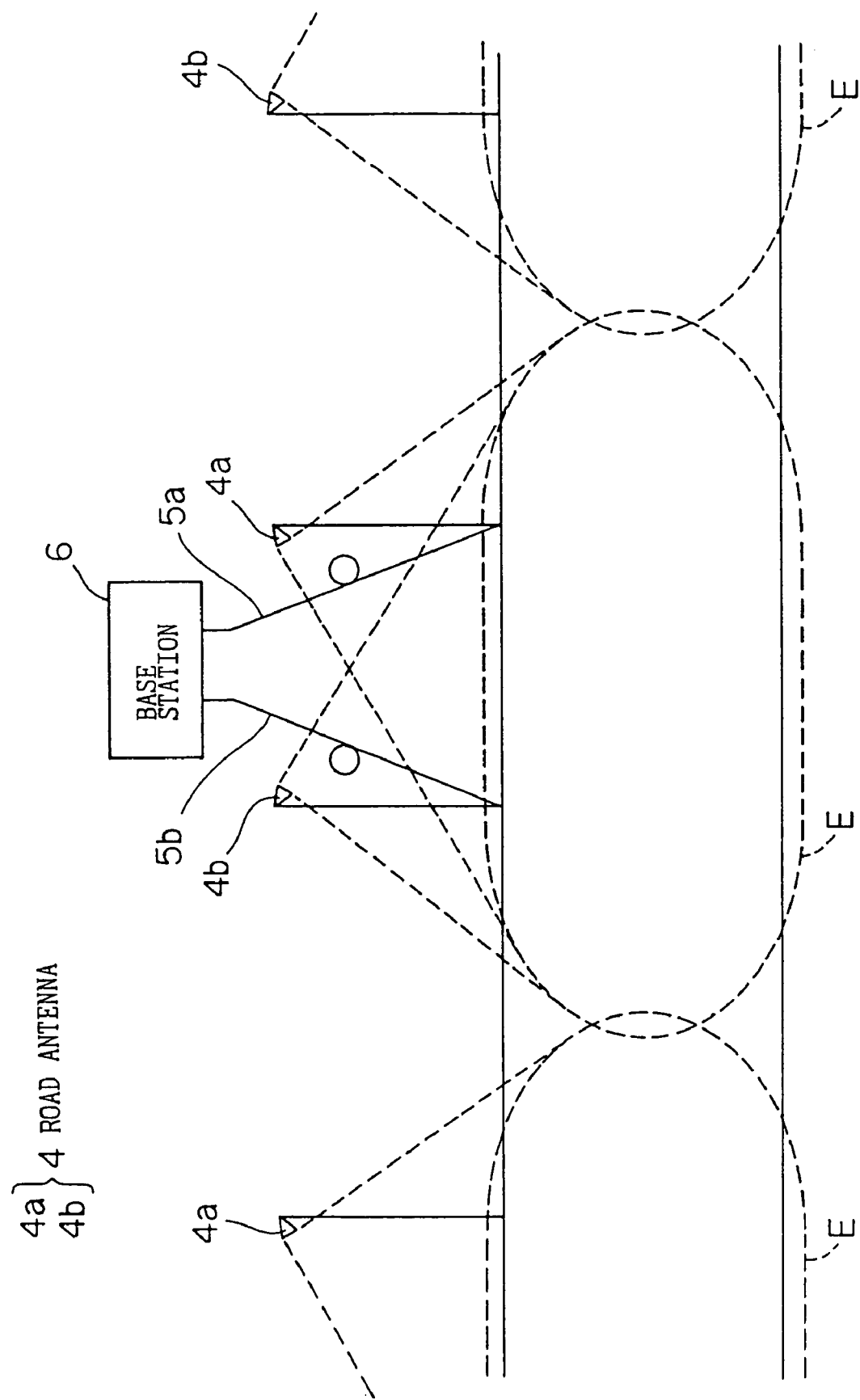
FIG. 8 is a diagram illustrating another exemplary road antenna installation.

According to the forgoing description, the pair of road antennas 4a, 4b forming a single cell E are disposed at opposite ends of each cell area with respect to the longitudinal direction of the road defined with the cell E. However, the locations of the road antennas 4a, 4b are not limited to the area ends. As shown in FIG. 8 for instance, the antennas may be located at places rather closer to the midportion of the cell E than at the area ends. In the foregoing description, a single cell E is formed by a pair of road antennas 4a, 4b but may be formed by three or more road antennas. Briefly, the road antennas 4 may be varied in the location and the number so long as they are capable of applying the waves to the vehicle 2 in different incoming directions.

According to the foregoing description, the road antennas 4a, 4b employ the optical fiber radio signal transmission system thereby directly converting the reception signals to the optical signals, dispensing with the frequency conversion. Alternatively, the road antennas 4a, 4b may take a procedure such that the reception signals are down-converted to intermediate-frequency signals and then converted to the optical signals to be outputted to the optical fibers 5a, 5b. This procedure permits the use of a less costly, commonly used laser diode as the light source for the optical signal, thus contributing to cost reduction.

If, in this case, a system is used wherein the base station 6 outputs a local oscillation signal to the road antennas 4a, 4b (see, for example, Japanese Unexamined Patent Publication No.6-141361 (1994), the reception signals converted in the road antennas 4a, 4b may substantially matched in frequency.

In the foregoing description, a plurality of vehicle antennas 12a, 12b with specific directivities are provided and either of the reception signals received by the vehicle antennas are selected based on the reception levels of the received waves. However, an alternative configuration is also possible wherein, for example, a single vehicle antenna adapted to switch the directivities thereof is provided and is so controlled as to direct either of the road antennas 4a, 4b. A usable vehicle antenna is exemplified by an adaptive array antenna and the like.

Figure 9:
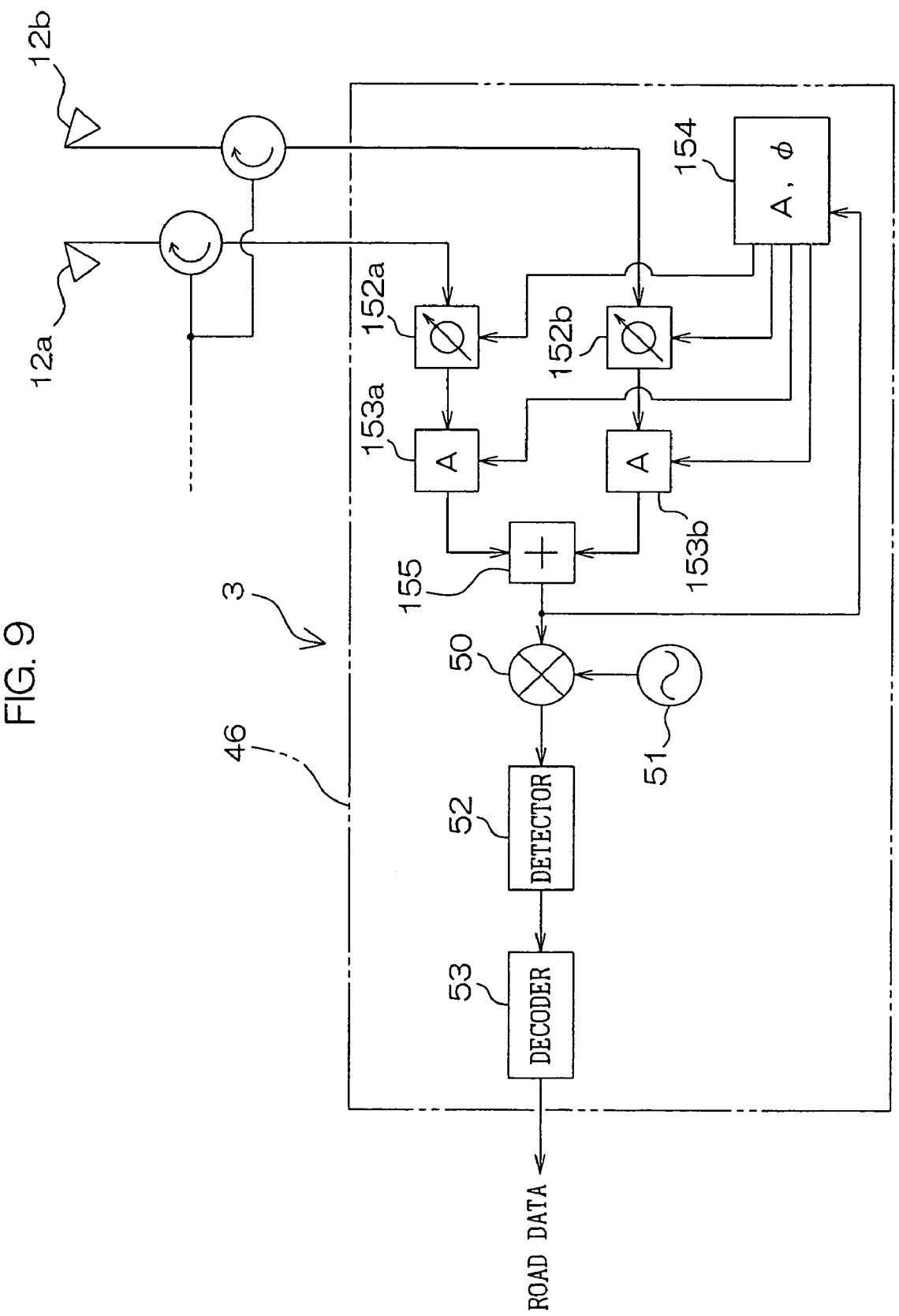
FIG. 9 is a block diagram illustrating a configuration of a reception unit 46 when an adaptive array antenna is applied to a vehicle antenna 12.

FIG. 9 illustrates a configuration wherein the adaptive array antenna is applied to the vehicle antenna 12. The reference characters 12a and 12b represent an element antenna, respectively. (Although two or more element antennas may actually be installed, the description takes an example for simplicity wherein two element antennas are provided.) Reception signals obtained from the element antennas 12a, 12b are fed back to a phase/amplitude control circuit 154. The phase/amplitude control circuit 154 uses a known adaptive control algorithm to calculate weighted amplitude vector and weighted phase vector for the reception of the strongest beam or the achievement of an optimum directivity of the vehicle antenna 12 (see, for example, H.Krim and M.Viberg, "Two Decades of Array Signal processing Research" IEEE Signal processing Magazine, pp.67-94, July 1996 and Sekiguchi and Inagaki, "Pattern Synthesis Theory", Electrical Communication Association, vol.48, No.4 (April, 1996). Phase/amplitude signals determined by the phase/amplitude control circuit 154 are supplied to phase shifting devices 152a, 152b, and amplifiers 153a, 153b where they are conditioned to optimum phase and amplitude. The reference character 155 represents a combiner circuit.

SECOND EMBODIMENT (Road Marker)

Figure 10:
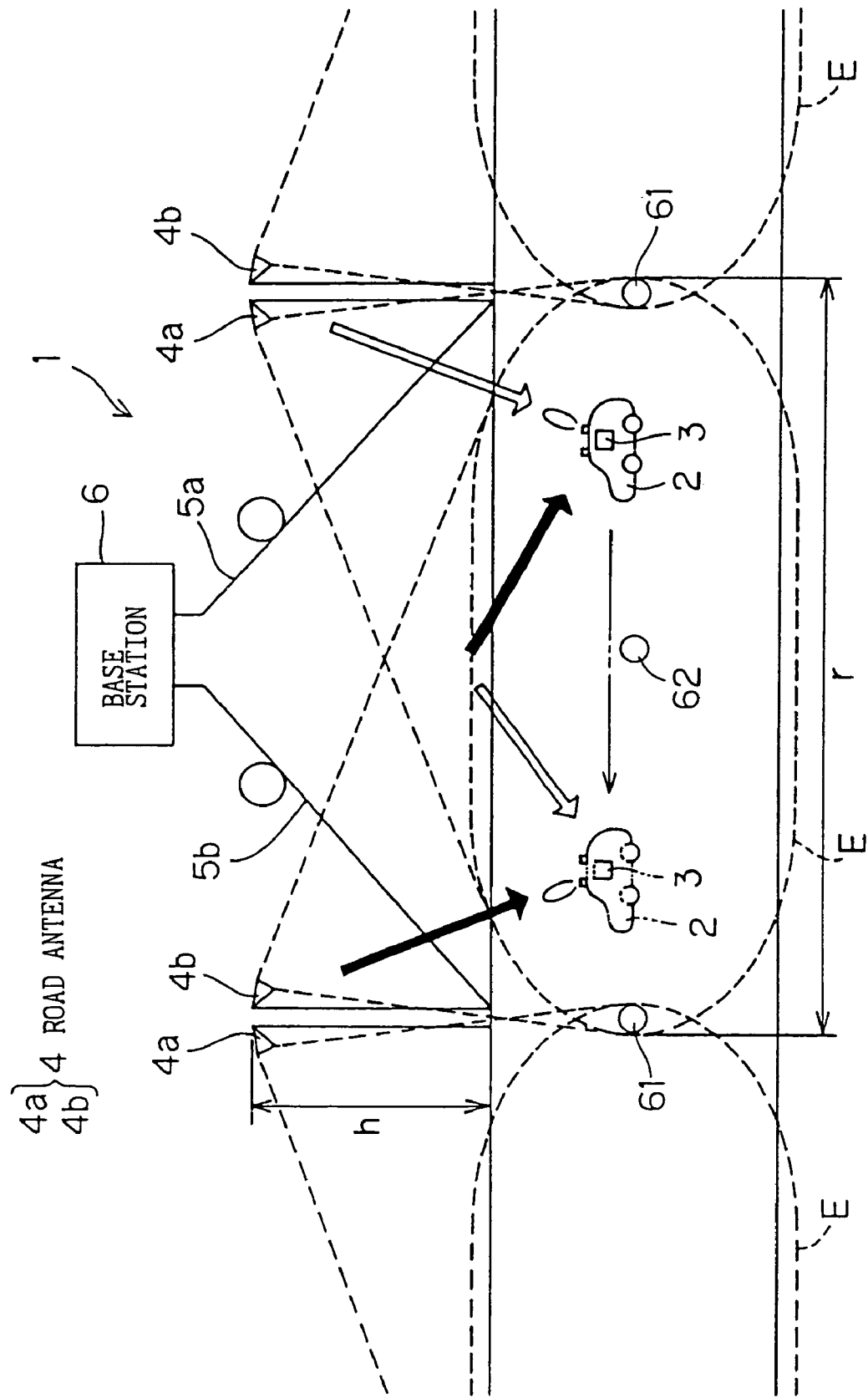
FIG. 10 is a conceptual representation of an arrangement of the roadway communication system according to a second embodiment hereof.

FIG. 10 is a conceptual representation of an arrangement of the roadway communication system according to a second embodiment of the invention. In FIG. 10, like functional portions are represented by like reference characters, respectively.

In the first embodiment, the vehicle mounted device 3 obviates the effects of fading and the like by selecting the reception signal corresponding to the maximum reception level. In contrast, the second embodiment obviates the effects of fading and the like by informing the vehicle mounted device 3 of a position on the road at which the maximum reception level is switched.

More specifically, road markers 61, 62, such as of magnet, color-coded reflector and light-emitting element, are installed in the road for indication of the position on the road at which the maximum reception level is switched. Specifically, the road markers 61, 62 are disposed on the road at longitudinal opposite ends and at a midportion of the cell E. In the road marker 61 disposed at the area end, a code is implemented in the magnetic field direction or color spectrum for indication of that the radiation from the first road antenna 4a reaches the maximum reception level at this point. In the road marker 62 disposed substantially centrally of the cell E, a code is provided for indication of that the radiations from the first and second antennas 4a, 4b become equal in the reception level at this point.

Figure 11:
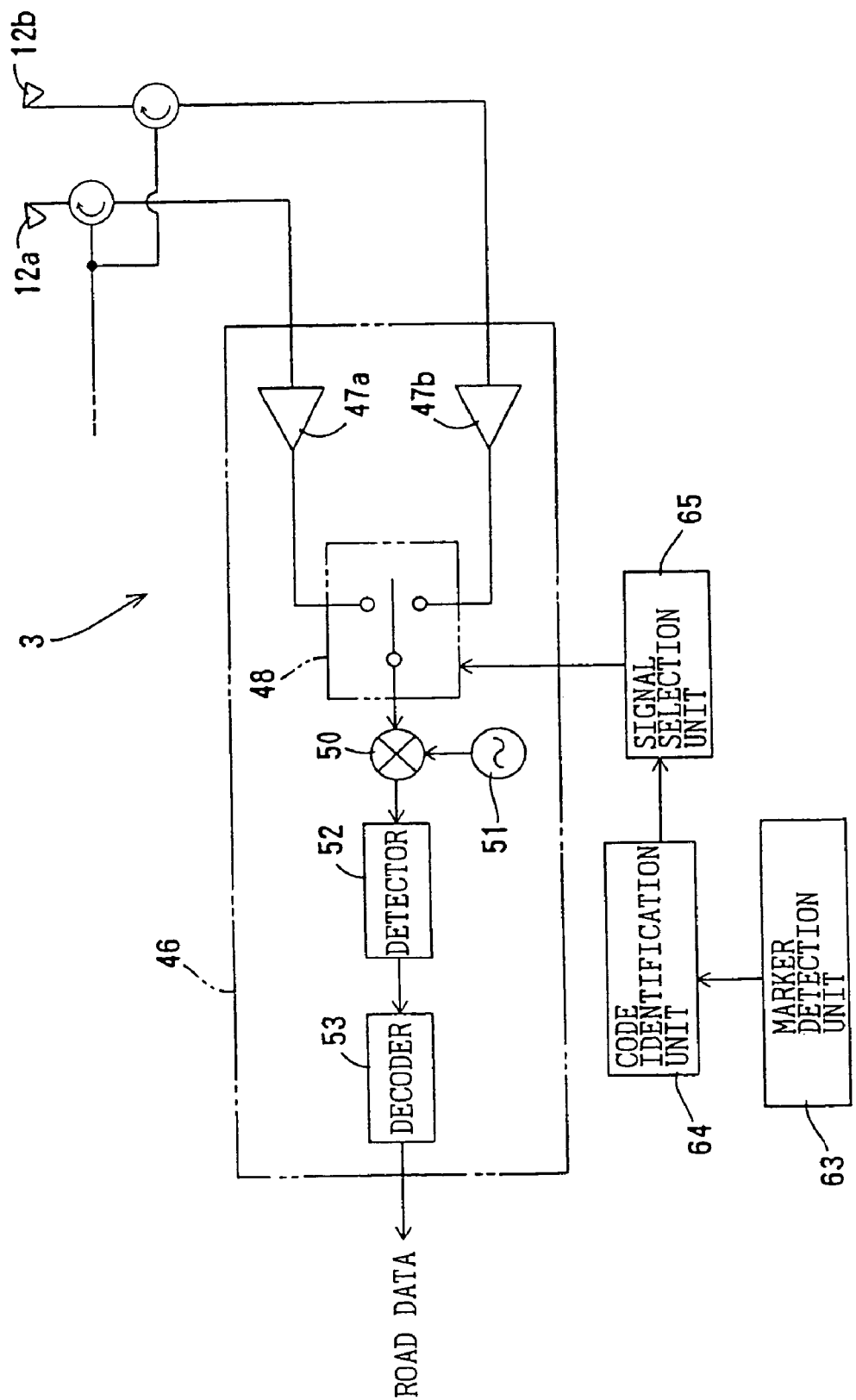
FIG. 11 is a block diagram illustrating an electrical configuration of a reception unit in a vehicle mounted device.

As shown in FIG. 11, the vehicle mounted device 3 includes a marker detection unit 63, such as comprised of a magnetic sensor, photodetector or the like, for detection of the road markers 61, 62; a code identification unit 64 for identification of a code in correspondence to the road marker 61, 62 detected by the marker detection unit 63; and a signal selection unit 65 for selectively passing either one of the two reception signals that corresponds to the maximum reception level based on the determination made by the code identification unit 64.

The marker detection unit 63 detects the road marker 61 when the vehicle 2 enters the cell E or leaves the cell E. At this time, the code identification unit 64 determines that the radiation from the first road antenna 4a presents the maximum reception level. As a result, the switch unit 48 is controlled by the signal selection unit 65 thereby to pass the reception signal from the first road antenna 4a. Thus, when the vehicle 2 is at the position indicated by the solid line in FIG. 10, the reception signal from the first road antenna 4a is selected and subjected to the detection and decoding processings.

When, on the other hand, the vehicle 2 passes the midportion of the cell E, the marker detection unit 63 detects the road marker 62 such that the code identification unit 64 determines that the radiation from the second road antenna 4b presents the maximum reception level. Accordingly, the signal selection unit 65 provides control of the switch unit 48 for passage of the reception signal from the second road antenna 4b. Thus, when the vehicle 2 is at the position indicated by the two-dot-dash line in FIG. 10, the reception signal from the second road antenna 4b is selected and subjected to the detection and decoding processings.

According to the second embodiment, the reception signal corresponding to the maximum reception level can be selected without monitoring the reception level for avoiding the fading effect due to the interference between the first and second road antennas 4a, 4b. The reception signal can be selected by simple processings.

THIRD EMBODIMENT (Polarized Wave)

Next, the description of a third embodiment focuses on difference from the first embodiment.

Figure 12:
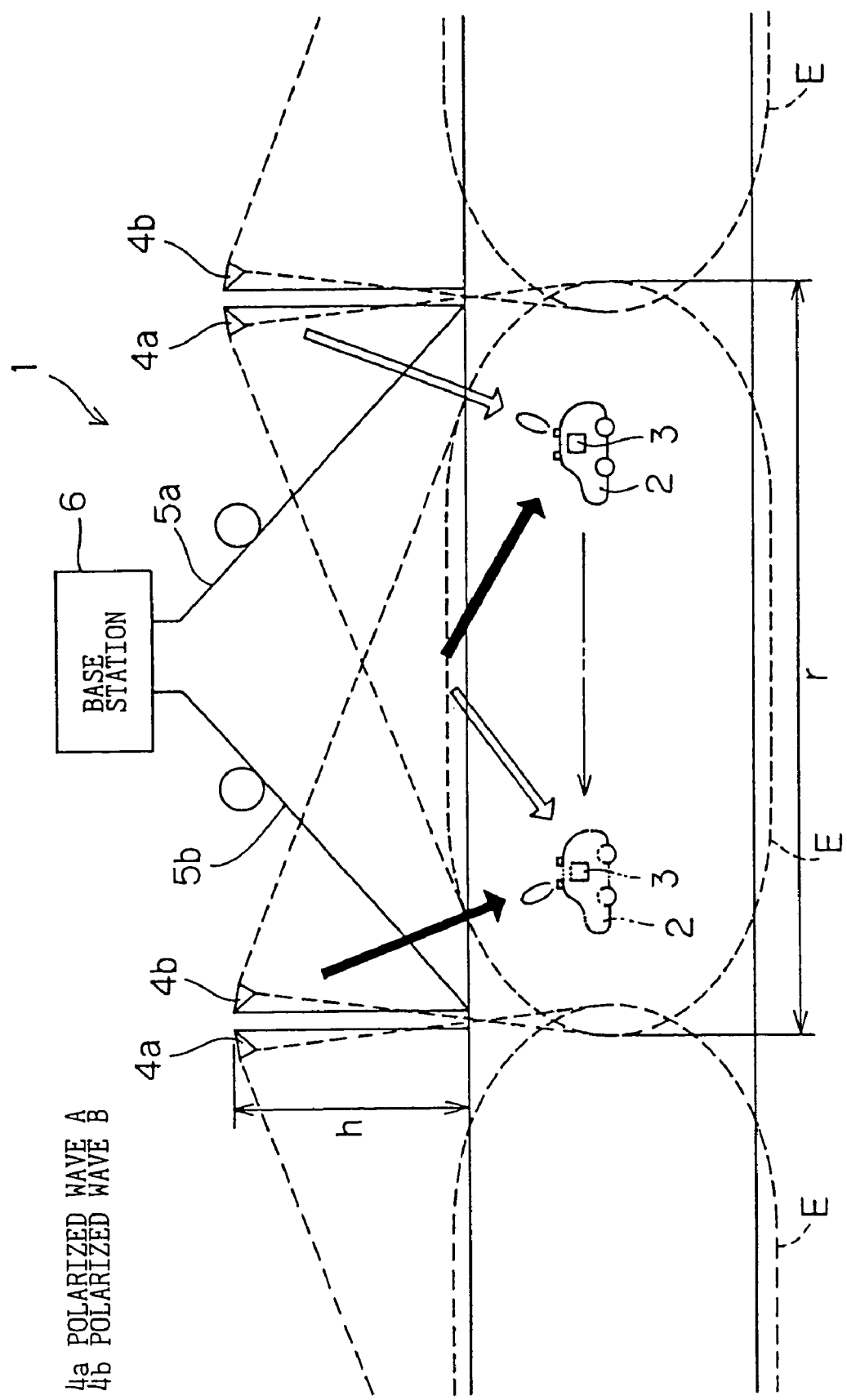
FIG. 12 is a conceptual representation of the roadway communication system according to a third embodiment hereof.

FIG. 12 is a conceptual representation of an arrangement of the roadway communication system according to the third embodiment.

The first and second road antennas 4a, 4b are adapted to radiate the cell E with the electromagnetic waves in the form of a polarized wave A and a polarized wave B, respectively, the waves being at the same frequency (6 GHz) and orthogonally polarized with respect to each other. More specifically, the first road antenna 4a radiates the polarized wave A in a direction of the hollow arrow whereas the second road antenna 4b radiates the polarized wave B in a direction of the solid arrow. Accordingly, the electromagnetic waves of the same frequency and of different polarization characteristics are incident on any point in the cell E in longitudinally forward and backward directions with respect to the road. It is noted that the pair of waves orthogonally polarized with respect to each other include a pair of a right hand circularly polarized wave and a left hand circularly polarized wave, and a pair of a horizontally polarized wave and a vertically polarized wave, and the like.

Figure 13:
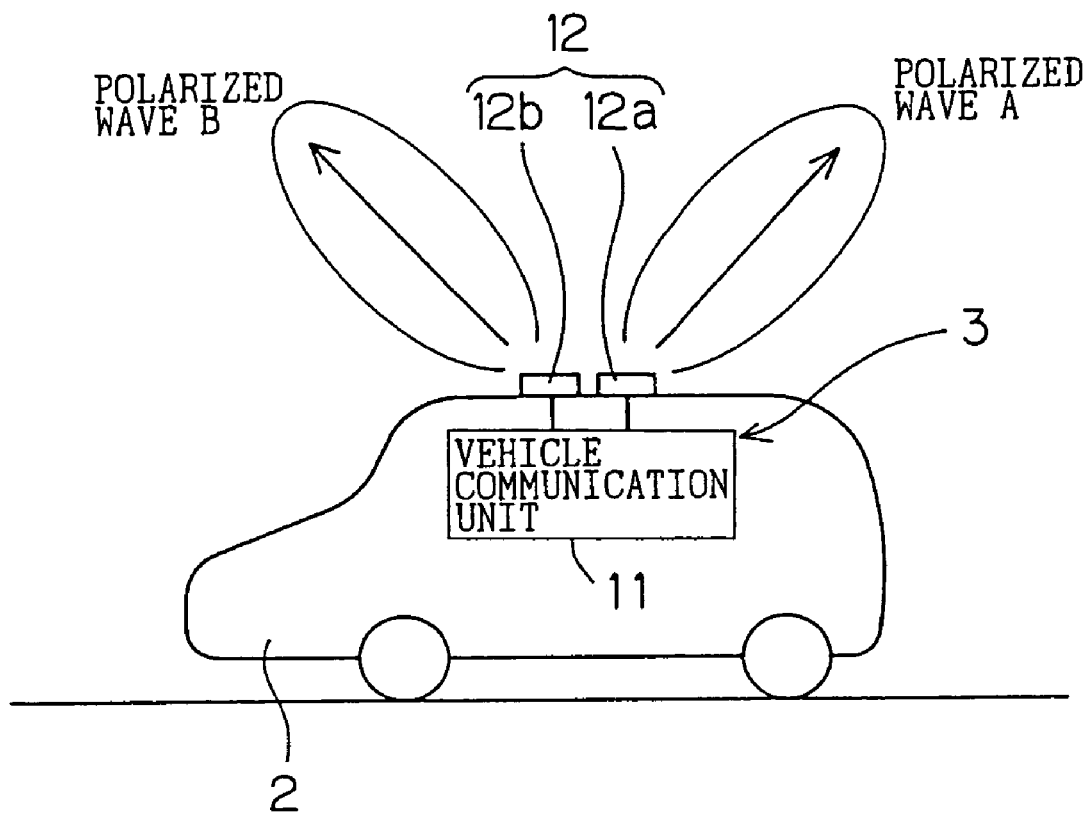
FIG. 13 is a conceptual representation of an exemplary arrangement of the vehicle mounted device.

FIG. 13 is a conceptual representation of an arrangement of the vehicle mounted device 3. The vehicle mounted device 3 includes the vehicle communication unit 11 and the vehicle antenna unit 12. The vehicle antenna unit 12 includes a pair of vehicle antennas 12a, 12b mounted on the ceiling of the vehicle 2, for example. The vehicle antennas 12a, 12b are juxtaposed along an anteroposterior direction of the vehicle 2, having orthogonally polarized characteristics with respect to each other. More specifically, the vehicle antenna unit 12 radiates the polarized wave B forwardly and the polarized wave B rearwardly and receives them. This permits the vehicle antennas 12a, 12b to receive the electromagnetic waves at high power level from the road antennas 4a, 4b which are directive to the cell. In radiation of waves containing the vehicle data, the vehicle antennas 12a, 12b provide respective radiations of waves orthogonally polarized with respect to each other toward the respective road antennas 4a, 4.

Although FIG. 13 illustrates that the vehicle antennas 12a, 12b have the directivities in the anteroposterior directions of the vehicle 2, antennas without the anteroposterior directivities, such as non-directional antenna, may be used. Briefly, the vehicle antennas 12a, 12b may have orthogonally polarized characteristics with respect to each other because even antennas without the anteroposterior directivities are capable of providing the polarization diversity effect of the third embodiment.

Figure 14:
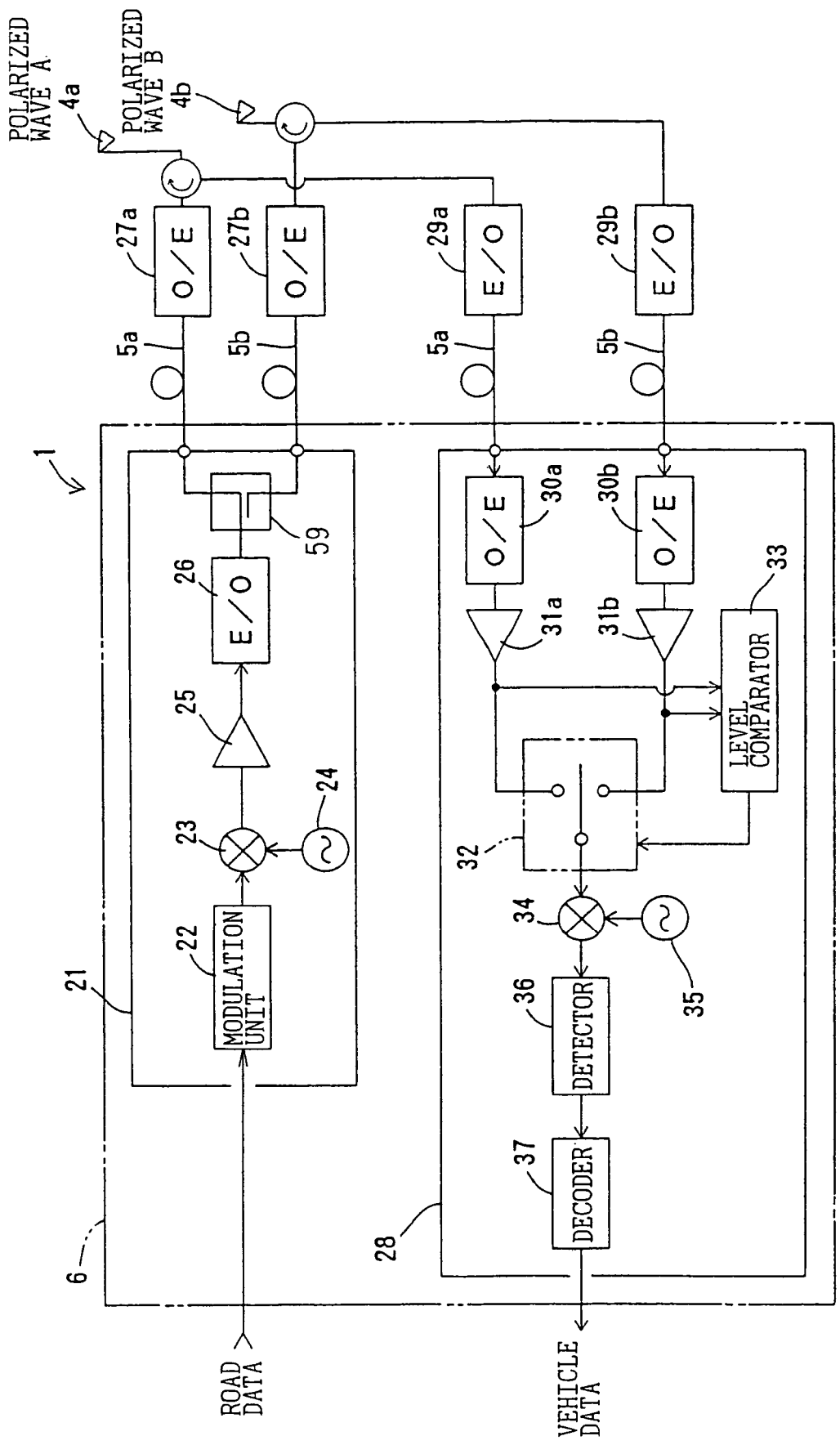
FIG. 14 is a block diagram illustrating an exemplary electrical configuration of the stationary station.

FIG. 14 is a block diagram illustrating an electrical configuration of the stationary station 1. The block diagram differs from the block diagram of FIG. 3 in that the road antennas 4a, 4b radiate and receive the electromagnetic waves in the form of polarized wave A and polarized wave B, respectively.

Referring to FIG. 14, the following procedure takes place. The transmission unit 21 converts radio transmission output signals to optical signals. The resultant signals are converted to electrical signals in optic-electrical converters (O/E) 27a, 27b of the road antennas 4a, 4b. Subsequently, the electrical signals are radiated from the road antennas 4a, 4b as the polarized wave A and polarized wave B, respectively.

When the road antennas 4a, 4b receive the radiations from the vehicle antennas 12a, 12b, reception signals corresponding to the received waves are directly converted to optical signals in the electro-optical converters (E/O) 29a, 29b, respectively. The resultant signals are outputted to the down-cables 5a, 5b, respectively, to be supplied to the reception unit 28 of the base station 6.

The reception unit 28 includes the two optic-electrical converters (O/E) 30a, 30b where the optical signals are converted back to the original reception signals. The reception signals are respectively amplified by the high-frequency amplifiers 31a, 31b before applied to the switch unit 32 such as comprised of a semiconductor switch. The amplified reception signals are also supplied to the level comparator 33. The level comparator 33 compares the reception levels of the reception signals thereby determining which of the signals are at the higher reception level. Then, the comparator provides control of the switch unit 32 for passage of the reception signal with the maximum reception level.

In the configuration shown in the block diagram of FIG. 13, the two signals are switched by the switch unit 32. However, an alternative configuration is possible wherein the two signals are weighted with a predetermined weighting factor and then combined. In this case, "the predetermined weighting factor" is determined based on the reception levels of the reception signals compared by the level comparator 33.

In the block diagram of FIG. 14, the switch unit 32 operates to switch the high-frequency signals amplified by the high-frequency amplifiers 31a, 31b. An alternative configuration is possible wherein data detected by a detector 36 are switched or combined. Another configuration is also possible wherein data decoded by the decoder 37 are switched or combined.

The base station 6 of the third embodiment is adapted to select the reception signal based on the combination of the so-called site diversity technique and the polarization diversity technique. Accordingly, the vehicle data are accurately restored in the subsequent processing.

Figure 15:
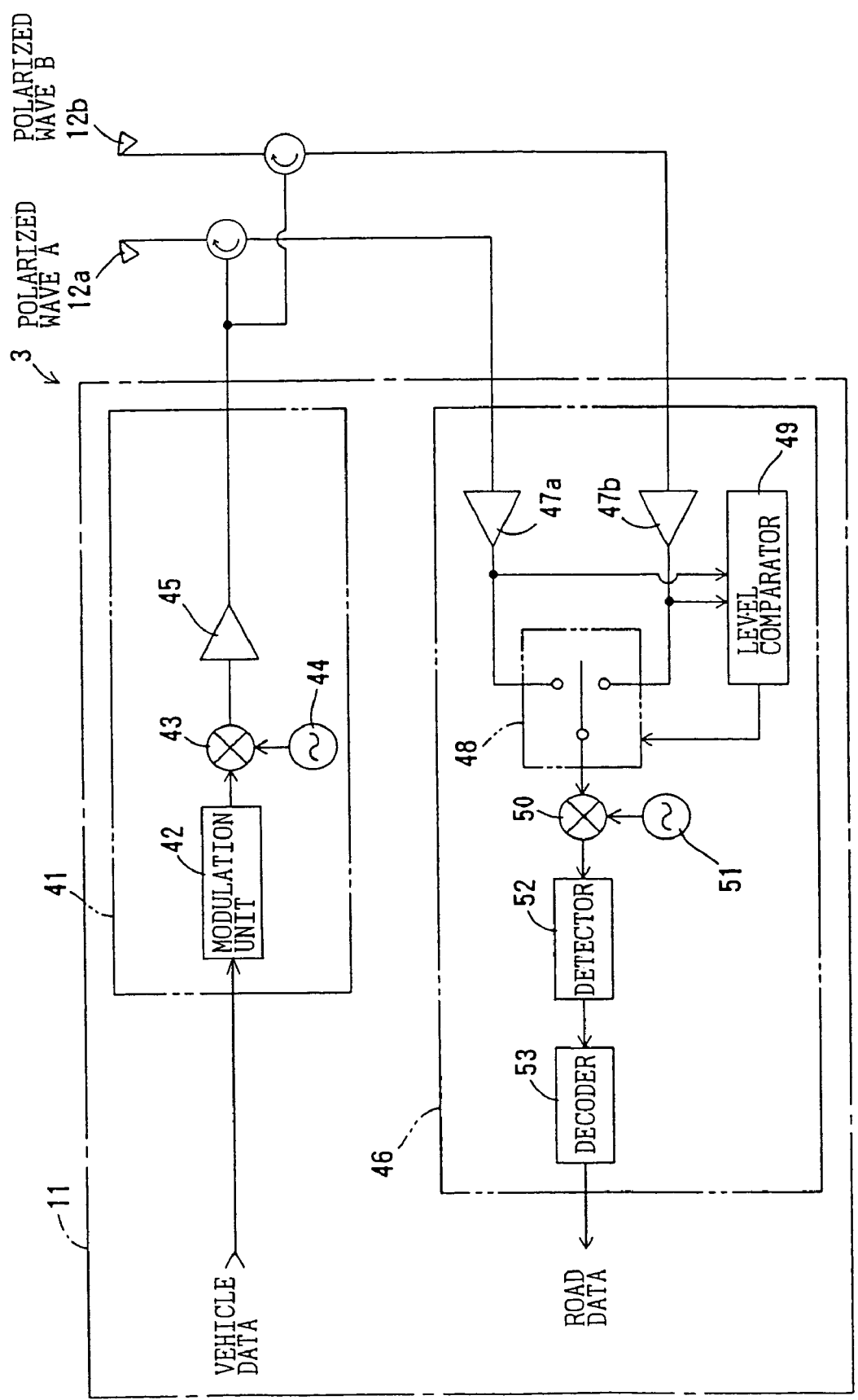
FIG. 15 is a block diagram illustrating an exemplary electrical configuration of the vehicle mounted device.

FIG. 15 is a block diagram illustrating an electrical configuration of the vehicle mounted device 3. The diagram differs from FIG. 5 in that the radio transmission output signals are amplified by the high-frequency amplifier 45 and then supplied to the vehicle antennas 12a, 12b which, in turn, radiate the signals in the form of polarized wave A and polarized wave B, respectively.

The vehicle communication unit 11 further includes the reception unit 46 for obtaining the road traffic data from the road antennas 4a, 4b. When the vehicle antennas 12a, 12b receive the radiations from the road antennas 4a, 4b, the reception signals corresponding to the received waves are supplied to the vehicle communication unit 11. The reception signals are amplified by the high-frequency amplifiers 47a, 47b and then supplied to the switch unit 48 such as comprised of a semiconductor switch or the like. The reception signals are also applied to the level comparator 49. The level comparator 49 compares the reception levels of the reception signals to determine which of the signals has the higher reception level. Subsequently, the comparator provides control of the switch unit 48 for passage of the reception signal with the maximum reception level.

In the block diagram of FIG. 15, the two signals are switched by the switch unit 48. However, an alternative configuration is possible wherein the two signals are weighted with a predetermined weighting factor and combined. In this case, "the predetermined weighting factor" is determined based on the reception levels of the reception signals compared by the level comparator 33.

In the block diagram of FIG. 15, the switch unit 48 switches the high-frequency signals amplified by the high-frequency amplifiers 47a, 47b. However, an alternative configuration is possible wherein data detected by the detector 52 are switched or combined. Otherwise, data decoded by the decoder 53 may be switched or combined.

The reception signals through the switch unit 48 are applied to the mixer 50 where they are combined with a frequency-conversion carrier outputted from a local oscillator 51 for frequency conversion. Subsequently, the resultant signals are supplied to the detector 52 for coherent detection using a demodulation carrier. Then, the signals are applied to the decoder 53 where they are converted to reception signals corresponding to the road traffic data.

In the vehicle mounted device 3, the so-called multipath environment is established because the electromagnetic waves at the same frequency are received along forward and backward directions of the vehicle 2. However, the effect of fading with the sharp fluctuations in amplitude and phase can be obviated because the incoming waves forwardly and rearwardly of the vehicle 2 have orthogonal polarization planes with respect to each other.

Since the operations described with reference to FIGS. 6 and 7 may be directly applied to the selection from the two polarized reception signals, the description thereof is dispensed with.

As mentioned supra, the third embodiment provides a single cell E with two propagation paths for the waves radiated from the road antenna 4 while the vehicle mounted device 3 is adapted to select the polarized reception signal of the maximum reception level and to process it. Therefore, the blocking of waves and multipath interference are prevented even when the vehicle 2 is traveling near the large vehicle such as a truck.

According to the forgoing description, the pair of road antennas 4a, 4b forming a single cell E are disposed at longitudinal opposite ends of each cell area with respect to the road defined with the cell E. However, the road antennas 4a, 4b may be located at places rather closer to the central portion of the cell E than at the area ends, as described with reference to FIG. 8.

In the foregoing description, a single cell E is formed by a pair of road antennas 4a, 4b but may be formed by three or more road antennas. Briefly, the road antennas 4 may be varied in the location and the number so long as they are capable of applying the polarized waves to the vehicle 2 in different incoming directions.

In the foregoing description, a plurality of vehicle antennas 12a, 12b with specific polarization characteristics are provided and either of the reception signals received by the vehicle antennas is selected based on the reception levels of the received waves. However, an alternative arrangement is also possible wherein, for example, a single vehicle antenna adapted to switch the polarization characteristics thereof is provided and is so controlled as to receive either of the polarized waves depending upon the reception levels of the waves. A usable vehicle antenna is exemplified by a polarization adaptive array antenna and the like.

As a configuration employing the polarization adaptive array antenna, the configuration of FIG. 9 is usable wherein the element antennas 12a, 12b are replaced by differently polarized element antennas (Although two or more element antennas may actually be installed, the description takes an example for simplicity wherein two element antennas are provided.) (See, for an exemplary configuration of the polarization array antenna, Itoh Yasuhiko & ?? Tasuku, "CURRENT STATE AND TRENDS OF THIN ANTENNAS" Electronic Information Communication Association, B Vol.J71-B No.11, pp.1217-1227 Nov.1988)).

Now referring to FIG. 9, assume, for example, that the element antenna 12a is a horizontal polarization antenna whereas the element antenna 12b is a vertical polarization antenna. The phase/amplitude control circuit 154 provides control based on the conventional adaptive control algorithm such that the vehicle antenna 12 has polarization characteristics of providing polarized waves carrying the most powerful signals (generally, elliptically polarized waves).

FOURTH EMBODIMENT (Road Marker)

Figure 16:
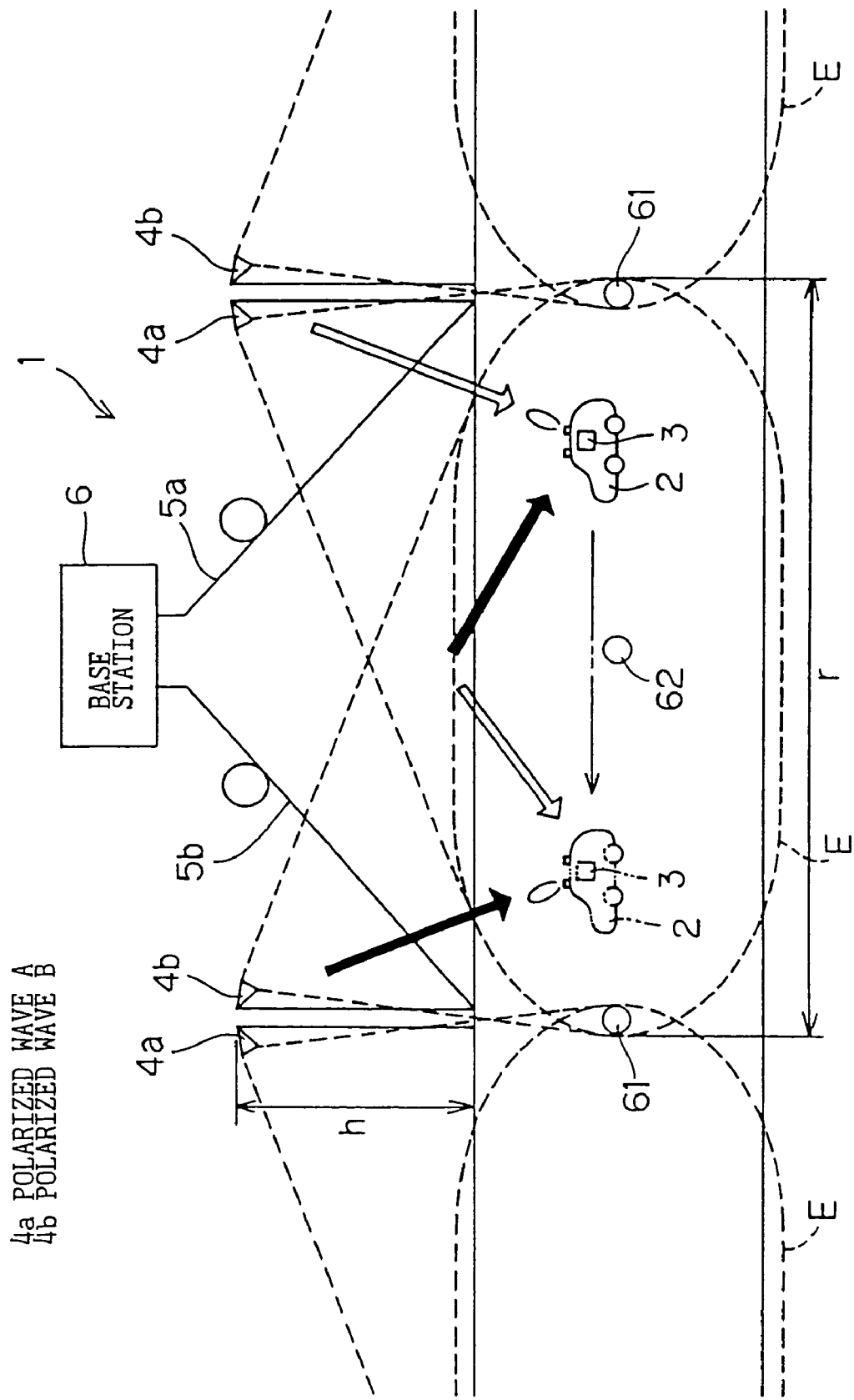
FIG. 16 is a conceptual representation of the communication system accruing to a fourth embodiment hereof.

FIG. 16 is a conceptual representation of an arrangement of the roadway communication system according to a fourth embodiment of the invention. In FIG. 16, like functional portions to those in FIG. 12 are represented by like reference characters, respectively.

The third embodiment obviates the effects of fading and the like by taking the steps of comparing the reception levels of the polarized reception waves and selecting the polarized reception signal of the maximum reception level. In contrast, the fourth embodiment obviates the effects of fading and the like by informing the vehicle mounted device 3 of a position on the road at which the reception signal of the maximum reception level is switched.

More specifically, the road markers 61, 62, such as of magnet, color-coded reflector and light-emitting element, are installed in the road for indication of the position on the road at which the maximum reception level is switched.

Figure 17:
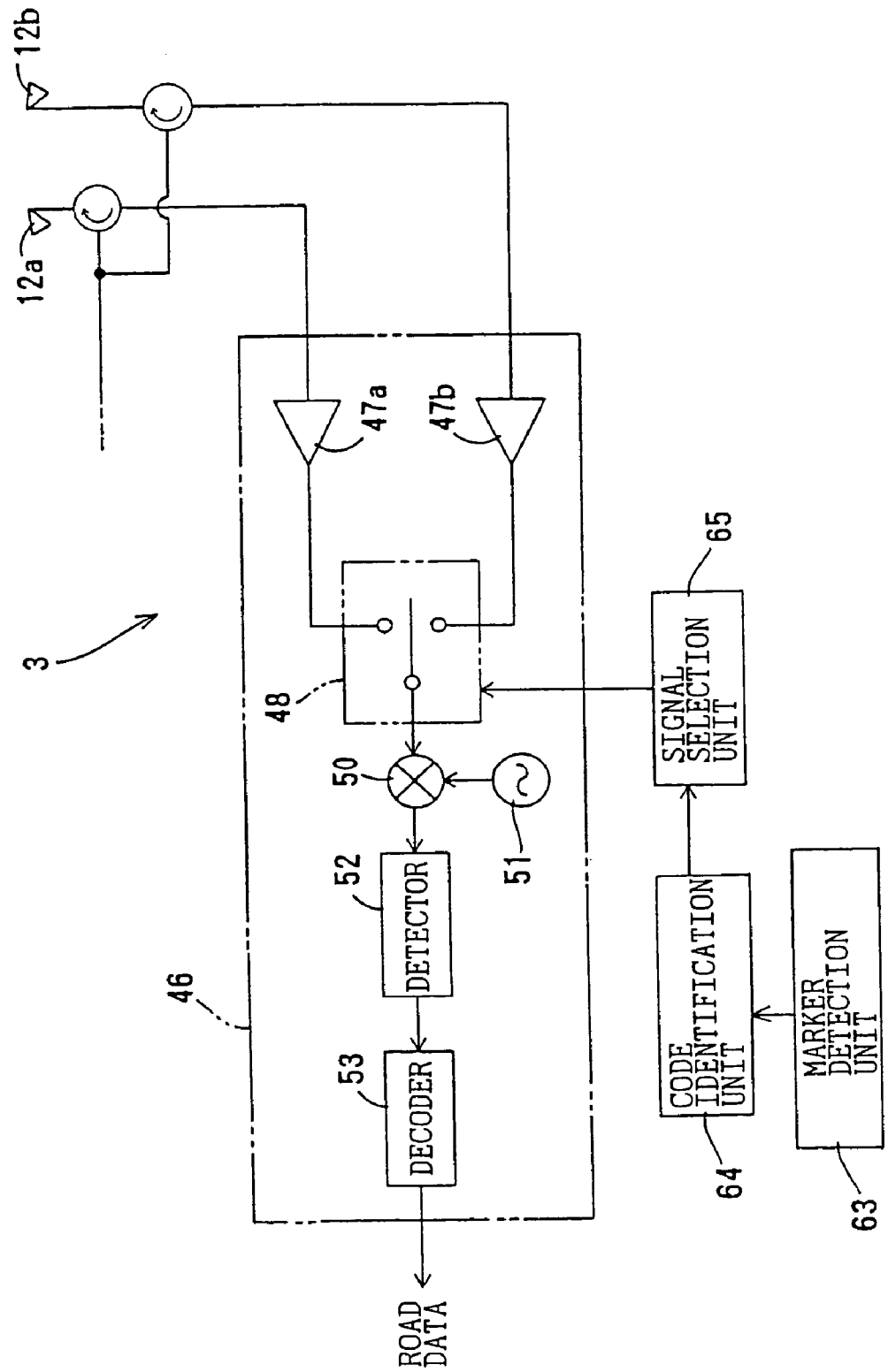
FIG. 17 is a block diagram illustrating an exemplary electrical configuration of the reception unit in the vehicle mounted device according to the fourth embodiment hereof.

As shown in FIG. 17, the vehicle mounted device 3 includes the marker detection unit 63 for detection of the road markers 61, 62; the code identification unit 64 for identification of a code in correspondence to the road marker 61, 62 detected by the marker detection unit 63; and the signal selection unit 65 for providing control of the switch unit 48 such that either one of the two reception signals that corresponds to the maximum reception level is passed based on the determination made by the code identification unit 64.

The marker detection unit 63 detects the road marker 61 when the vehicle 2 enters or leaves the cell E. At this time, the code identification unit 64 determines that the radiation from the first road antenna 4a presents the maximum reception level. Accordingly, the signal selection unit 65 provides control of the switch unit 48 for passage of the reception signal from the first road antenna 4a. Thus, the reception signal from the first road antenna 4a is selected and subjected to the detection and decoding processings.

When, on the other hand, the vehicle 2 passes the central portion of the cell E, the marker detection unit 63 detects the road marker 62 whereby the code identification unit 64 determines that the radiation from the second road antenna 4b presents the maximum reception level. Accordingly, the switch unit 48 is controlled by the signal selection unit 65 thereby to pass the reception signal from the second road antenna 4b. Thus, the reception signal from the second road antenna 4b is selected and subjected to the detection and decoding processings.

According to the fourth embodiment, the reception signal corresponding to the maximum reception level can be selected without monitoring the reception level for avoiding the fading due to the interference between the first and second road antennas 4a, 4b. Hence, the reception signals can be selected by the simple processings.

FIFTH EMBODIMENT (OFDM)

Figure 18:
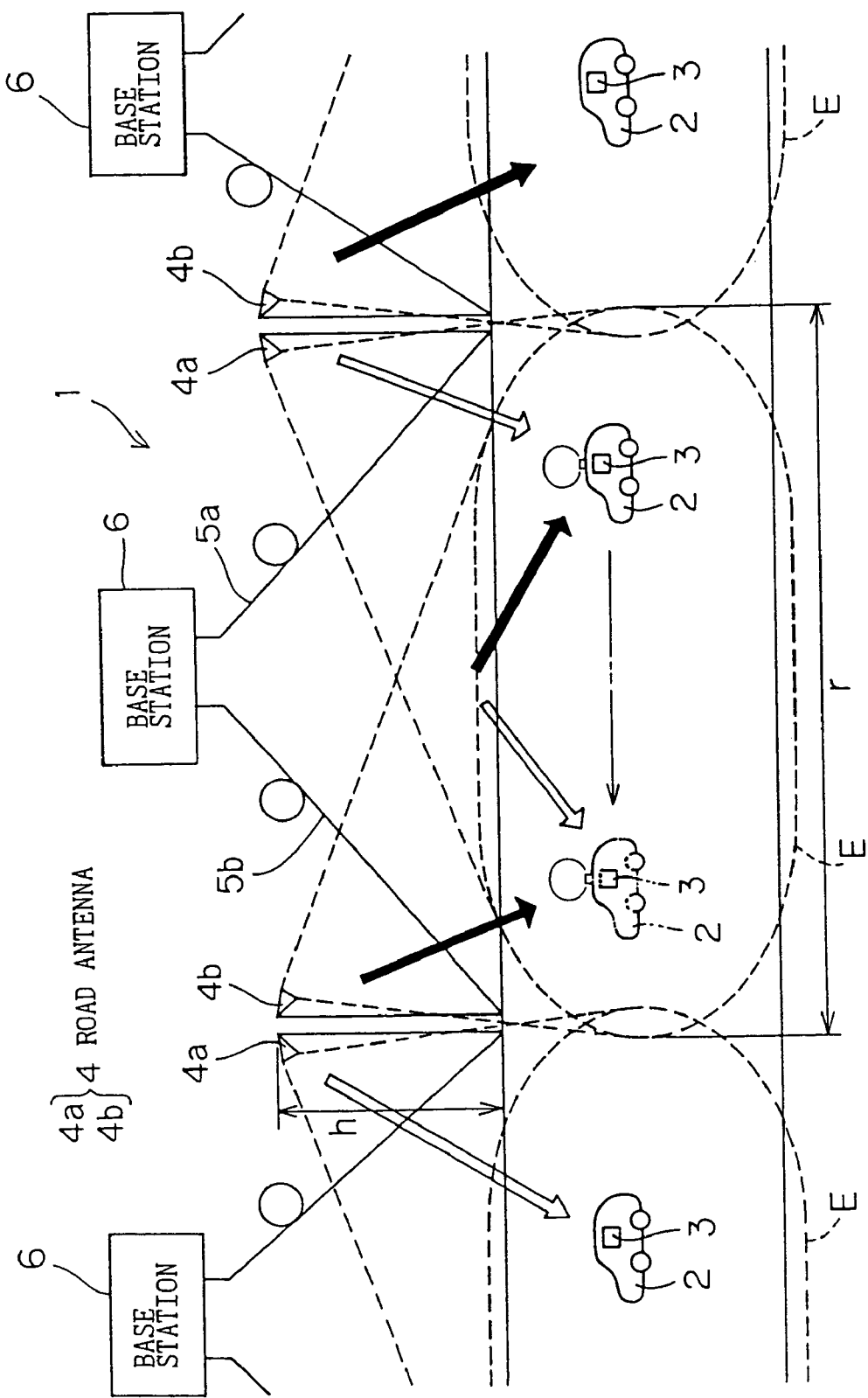
FIG. 18 is a conceptual representation of an arrangement of the roadway communication system according to a fifth embodiment hereof.

FIG. 18 is a conceptual representation of a configuration of the roadway communication system according to a fifth embodiment of the invention. This embodiment pertains a micro-cell roadway communication system employing Orthogonal Frequency Division Multiplex (OFDM) technique as a data modulation technique.

In the mobile communication system using a single carrier, it is a common practice to provide the transmission unit with an equalizer having an inverse characteristics of those of the transmission path thereby obviating the effect of inter-symbol interference caused by multipath delayed waves.

However, a car travels through the cell at such high speeds that the radio frequency energy field presents too sharp fluctuations per unit time for the equalizer to cope with the calculations. Thus, it is impossible to transmit signals at less than a given transmission error rate.

In addition, a large-scale hardware is required for implementing the equalizer, which results in great power consumption.

On this account, Orthogonal Frequency Division Multiplex system less susceptible to the inter-symbol interference due to multipath delayed waves is employed as the data modulation system.

In the stationary station 1, a plurality of cells E are continuously defined along the road. Near a boundary of individual cells E with respect to a longitudinal direction of the road, the first road antenna 4a and a second road antenna 4b are installed, which are directive toward each cell. The first and second road antennas 41, 4b each radiate the cell E with electromagnetic waves of the same frequency (e.g., in 6 GHz band). More specifically, the first road antenna 4a radiates the electromagnetic waves in a direction represented by the hollow arrow whereas the second road antenna 4b radiates the electromagnetic waves in a direction represented by the solid arrow. Accordingly, the waves of the same frequency are incident on any point in the cell E in longitudinally forward and backward directions of the road. Hence, when passing through the cell E, the vehicle 2 receives the electromagnetic waves incoming from front and from back.

The road antennas 4a, 4b are connected to the base station 6 via the optical fibers 5a, 5b, respectively. Each optical fiber 5a, 5b comprises an up-optical cable and a down-optical cable. The optical fibers reduce signal attenuation as compared with a coaxial cable or the like used as the transmission line, thus preventing the degradation of communication quality. As a matter of course, the optical fibers 5a, 5b may be replaced by the coaxial cables.

The base station 6 applies OFDM modulated signals to the road antennas 4a, 4b via the optical fibers 5a, 5b. Hence, the radiations from the road antennas 4a, 4b contain the same road traffic data. The base station 6 also obtains the vehicle data from the vehicle mounted device 3 via the road antennas 4a, 4b and properly processes the obtained data.

The base station 6 shares with neighboring base stations 6 the same carrier frequency for OFDM modulated waves. Also, the communicated data contain the same contents. The transmission of signals of the same content over the same carrier frequency channel negates the need for changing the frequency of the vehicle mounted oscillator at transfer of the vehicle to the neighboring cell. Hence, the vehicle mounted device does not require a costly oscillator for fast oscillation frequency pulling or multiple oscillators. This contributes to the reduction of device costs and size.

Figure 19:
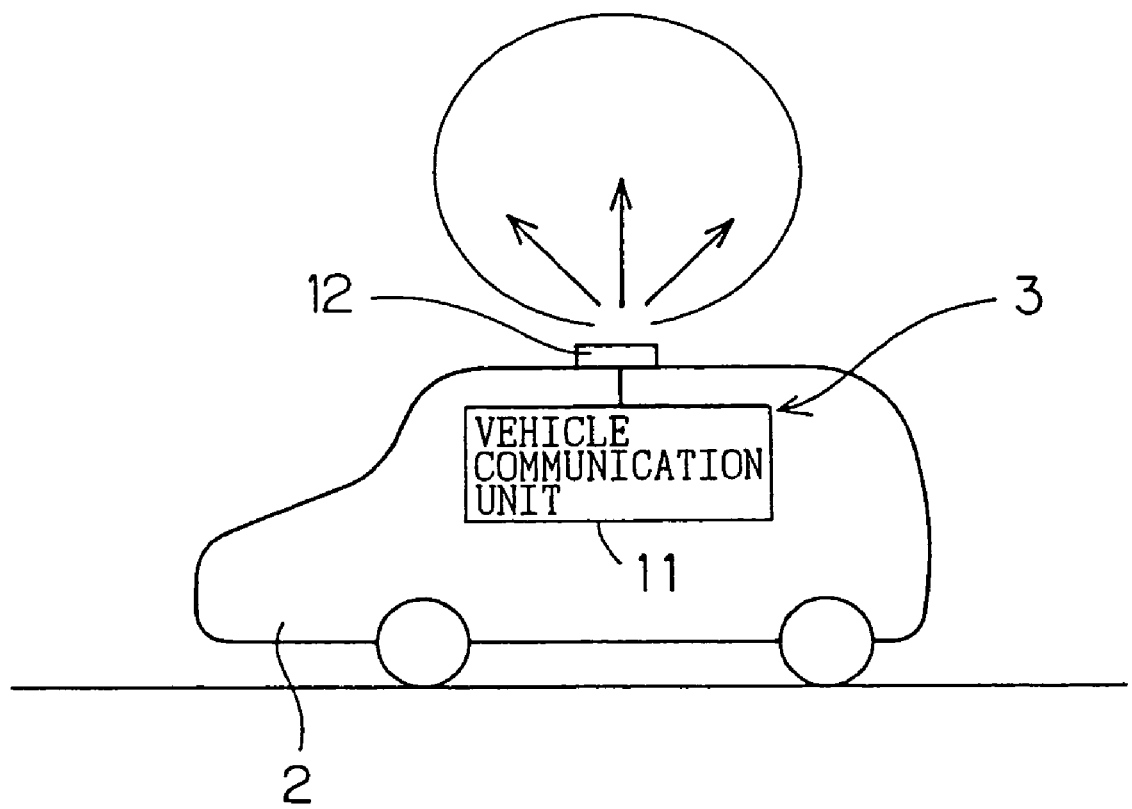
FIG. 19 is a conceptual representation of an arrangement of the vehicle mounted device.

FIG. 19 is a conceptual representation of a configuration of the vehicle mounted device 3 which includes the vehicle communication unit 11 and the vehicle antenna unit 12. The vehicle communication unit 11 radiates electromagnetic waves containing the vehicle data via the vehicle antenna unit 12. The vehicle communication unit 11 also receives the waves radiated from the road antennas 4a, 4b via the vehicle antenna unit 12, thereby obtaining the road traffic data contained therein for presenting the obtained road traffic data to a driver, for example.

Figure 20:
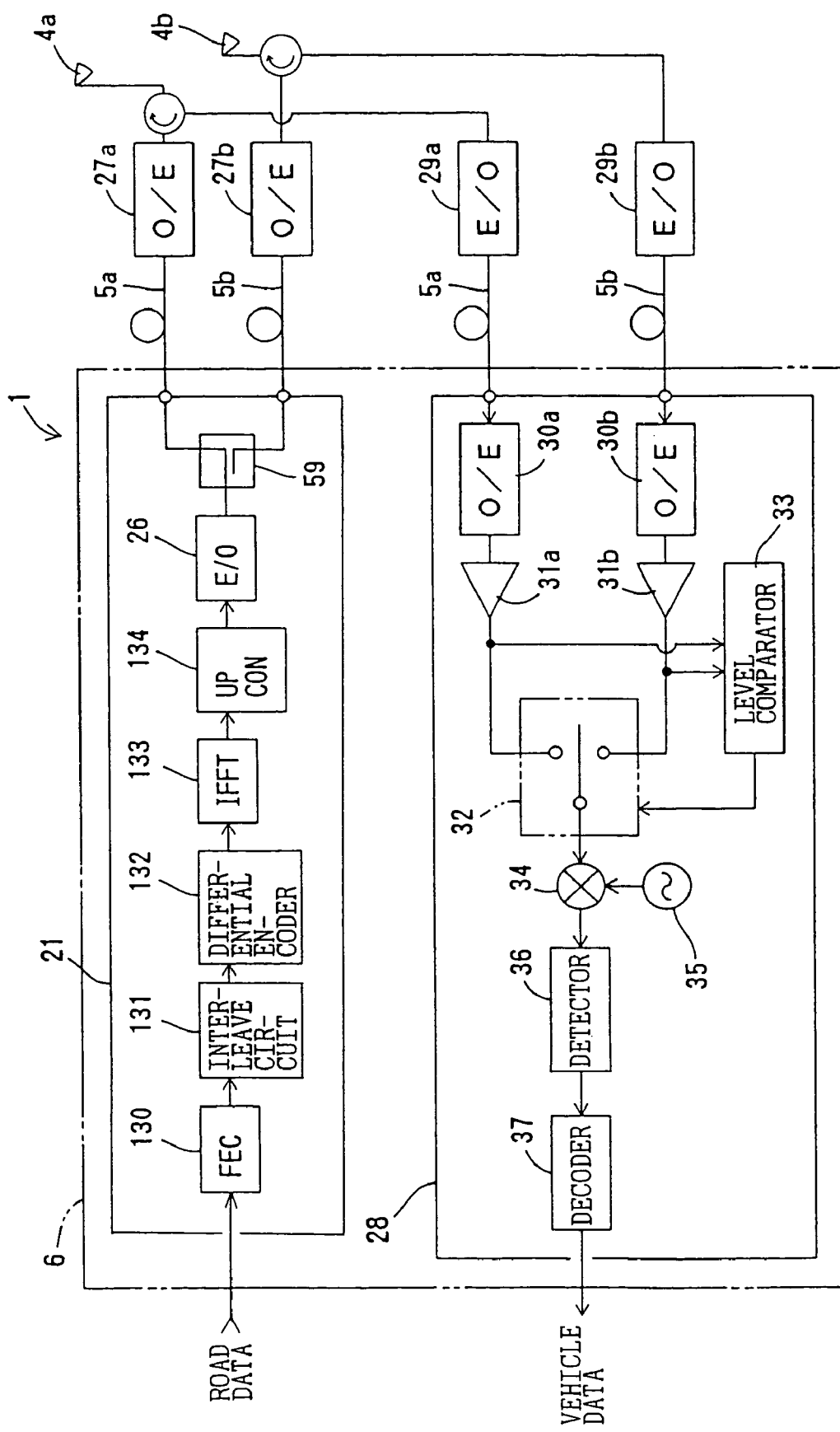
FIG. 20 is a block diagram illustrating an exemplary electrical configuration of the stationary station.

FIG. 20 is a block diagram illustrating an electrical configuration of the stationary station 1 which includes the transmission unit 21 for supplying the road traffic data to the road antenna 4. The transmission unit 21 employs OFDM modulation technique wherein data is divided into pieces and multiplexed with multiple orthogonal carriers with respect to each other.

The transmission unit 12 includes a forward error correction encoder 130, an interleave circuit 131, a differential encoder 132, an inverse Fourier function transformer 133, and an up-converter 134.

The forward error correction encoder 130 serves to correct block coding errors or convolutional coding errors. The error correction circuit is an effective means because field strength variations (standing waves) occur in the road which are responsible for irregular changes in amplitude and phase of the signals received by the traveling vehicle (fading).

The interleave circuit 131 performs time-interleave processing and frequency-interleave processing used in Digital Audio Broadcasting.

The differential encoder 132 performs encoding processing preparatory to demodulation based on extraction of difference from the preceding signal. When the transmission path becomes instable, the effect of the instable transmission path can be canceled through differential extraction.

The inverse Fourier function transformer 133 implements various functions which include translating serial information to parallel information through serial-to-parallel converter; performing inverse Fourier transform processing; translating inverse Fourier transformed information back to serial information; and time compressing the serial information and setting a guard time by placing a rear symbol in a forward position.

The up-converter 134 up-converts the waves to higher radio frequencies, similarly to the mixer 23.

The transmission signals up-converted by the up-converter 134 are converted to optical signals by the electro-optical converter (E/O) 26. The optical signals are distributed via the optical fiber coupler 59 to be provided as output to the optical fiber couplers 5a, 5b. The optical signals are transmitted through the optical fibers 5a, 5b so as to be converted to electrical signals by the respective optic-electrical converters (O/E) 27a, 27b mounted to the road antennas 4a, 4b. Subsequently, the resultant signals are radiated from the road antennas 4a, 4b.

Figure 21:
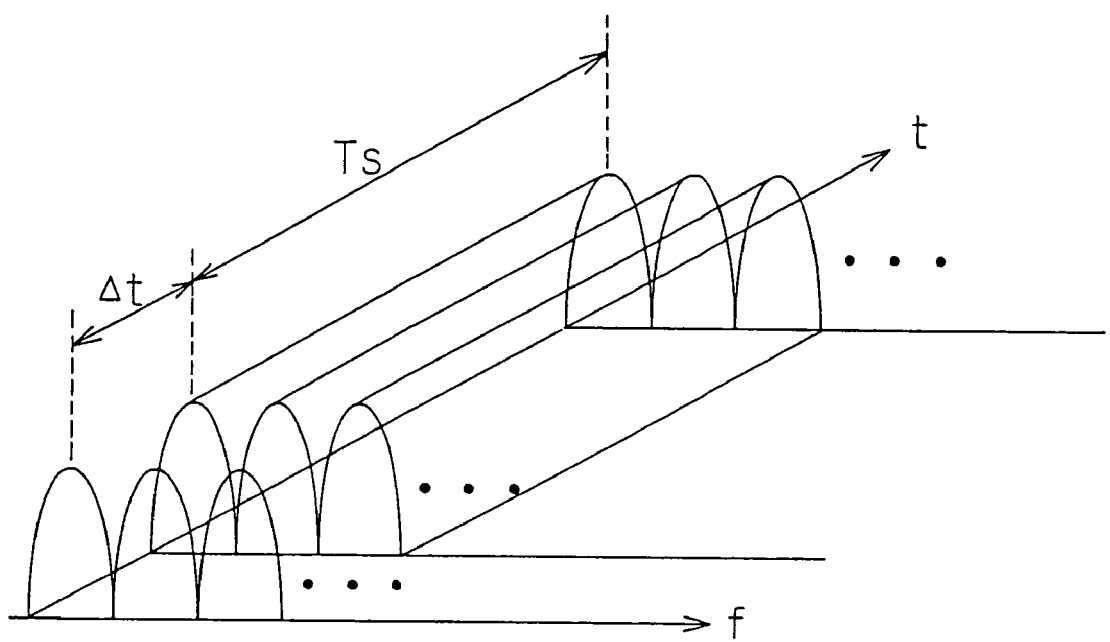
FIG. 21 is a graphical representation of symbol transmission based on OFDM technique with frequency axis represented by "f" and time axis represented by "t"

FIG. 21 is a graphical representation of symbol transmission based on OFDM wherein "f" indicates the frequency axis; "t" the time axis; TS the valid symbol length; and At the guard time. The time compression ratio is expressed as $(TS+\Delta t)/TS$.

The embodiment defines the guard time At to be longer than a time delay over the multipath. Because of the longer guard time, a symbol overlap may be ignored in the demodulation of the received signal with long propagation time delay.

The time delay over multipath can be determined by taking actual measurement at the cell. Otherwise, the time delay may be empirically determined from the size of the cell. Specifically, the time delay is estimated at about 500 nsec in a 100-m long cell.

As shown in FIG. 20, the base station 6 includes the reception unit 28 for obtaining the vehicle data via the road antennas 4a, 4b. When the radiation from the vehicle antenna unit 12 is received by the road antennas 4a, 4b, reception signals corresponding to the received waves are directly converted to optical signals by the electro-optical converters (E/O) 29a, 29b. Subsequently, the resultant optical signals are outputted to the down-cables 5a, 5b to be supplied to the reception unit 28 of the base station 6.

The reception unit 28 includes two optic-electrical converters (O/E) 30a, 30b where the optical signals are converted back to the original reception signals. The reception signals are amplified by the high-frequency amplifiers 31a, 31b and then supplied to the switch unit 32 such as comprised of a semiconductor switch or the like. The amplified signals are also applied to the level comparator 33. The level comparator 33 compares the reception levels of the reception signals to determine which of the signals has the higher reception level. Then, the comparator provides control of the switch unit 32 for passage of the reception signal with the maximum reception level. The reception signal through the switch unit 32 is applied to the mixer 34 where it is combined with a frequency-conversion carrier outputted from the local oscillator 35 for frequency conversion. The resultant signal is applied to the detector 36 where it is subject to coherent detection using a demodulation carrier. The detected signal is applied to the decoder 37 for conversion to the reception signal corresponding to the vehicle data.

According to the block diagram of FIG. 20, the two signals are switched by the switch unit 32. However, an alternative configuration is possible wherein the two signals are weighted using a predetermined weighting factor and then combined. In this case, "the predetermined weighting factor" is determined based on the reception levels of the reception signals compared by the level comparator 33.

According to the block diagram of FIG. 20, the switch unit 32 switches the high-frequency signals amplified by the high-frequency amplifiers 31a, 31b. However, an alternative configuration is possible wherein data detected by the detector 36 are switched or combined. Otherwise, data decoded by the decoder 37 may be switched or combined.

Figure 22:
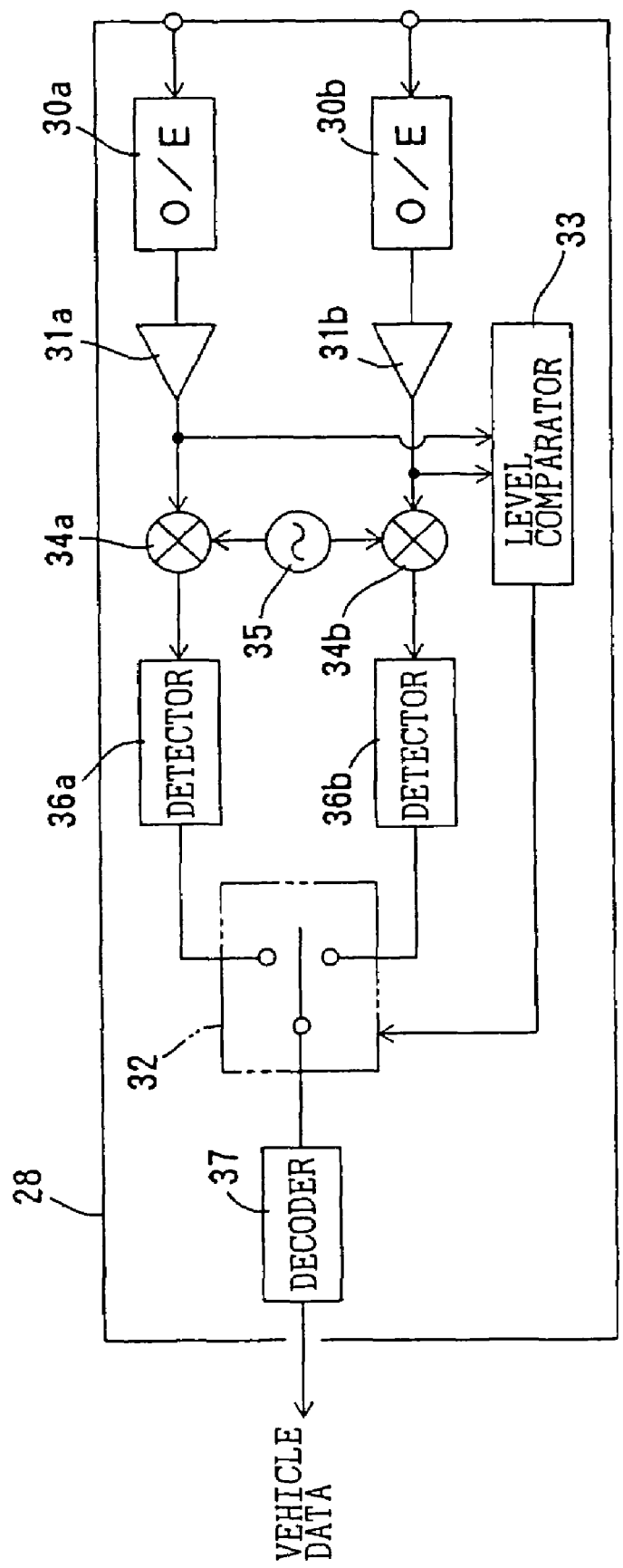
FIG. 22 is a block diagram illustrating another form of electrical configuration of the receiver in the stationary station.

FIG. 22 is a block diagram illustration a configuration wherein the switch unit 32 is disposed downstream of the detector for selection of a reception signal to be passed after coherent detection. More specifically, after amplified by the high-frequency amplifiers 31a, 31b, the reception signals are applied to the mixer 34a, 34b for frequency conversion. Then, the signals are coherently detected by the detectors 36a, 36b before applied to the switch unit 32. On the other hand, the level comparator 33 receives the reception signals amplified by the high-frequency amplifiers 31a, 31b and controls the switch unit 32 in a manner that the either of the reception signals that has the maximum reception level is allowed to pass the switch unit 32.

The procedure wherein the detection is followed by the selection of the reception signal is effective to obviate noise introduction into the reception signals, thus preventing the deterioration of communication quality.

The foregoing configuration employs the so-called optical fiber radio signal transmission system as a transmission system for outputting the optical signals to the optical fibers 5a, 5b.

This negates the need for mounting the transmission/reception unit to the respective road antennas 4a, 4, permitting the transmission/reception unit for the road antennas to take form as one set mounted to the base station 6. Thus, the road antennas 4a, 4b may be constructed simple. On the other hand, the base station 6 may process the reception signals fed from the road antennas 4a, 4b as they are at high frequencies. Hence, the level comparator 33 may readily compare the high-frequency reception levels of the reception signals.

The transmission unit 21 employs the OFDM modulation technique. In the OFDM system, carrier frequencies are arranged at narrow intervals. Therefore, any frequency shift will entail the inter-carrier interference and serious deterioration of the communication quality results. This drawback may be eliminated by employing the optical fiber radio signal transmission system where the signals are distributed via the optical fiber coupler 59. The reason is because the carriers radiated from the road antennas 4a, 4b, in principle, have the same frequency. Thus, the inventive roadway communication system takes full advantage of the merit of OFDM technique resisting multipah interference.

Figure 23:
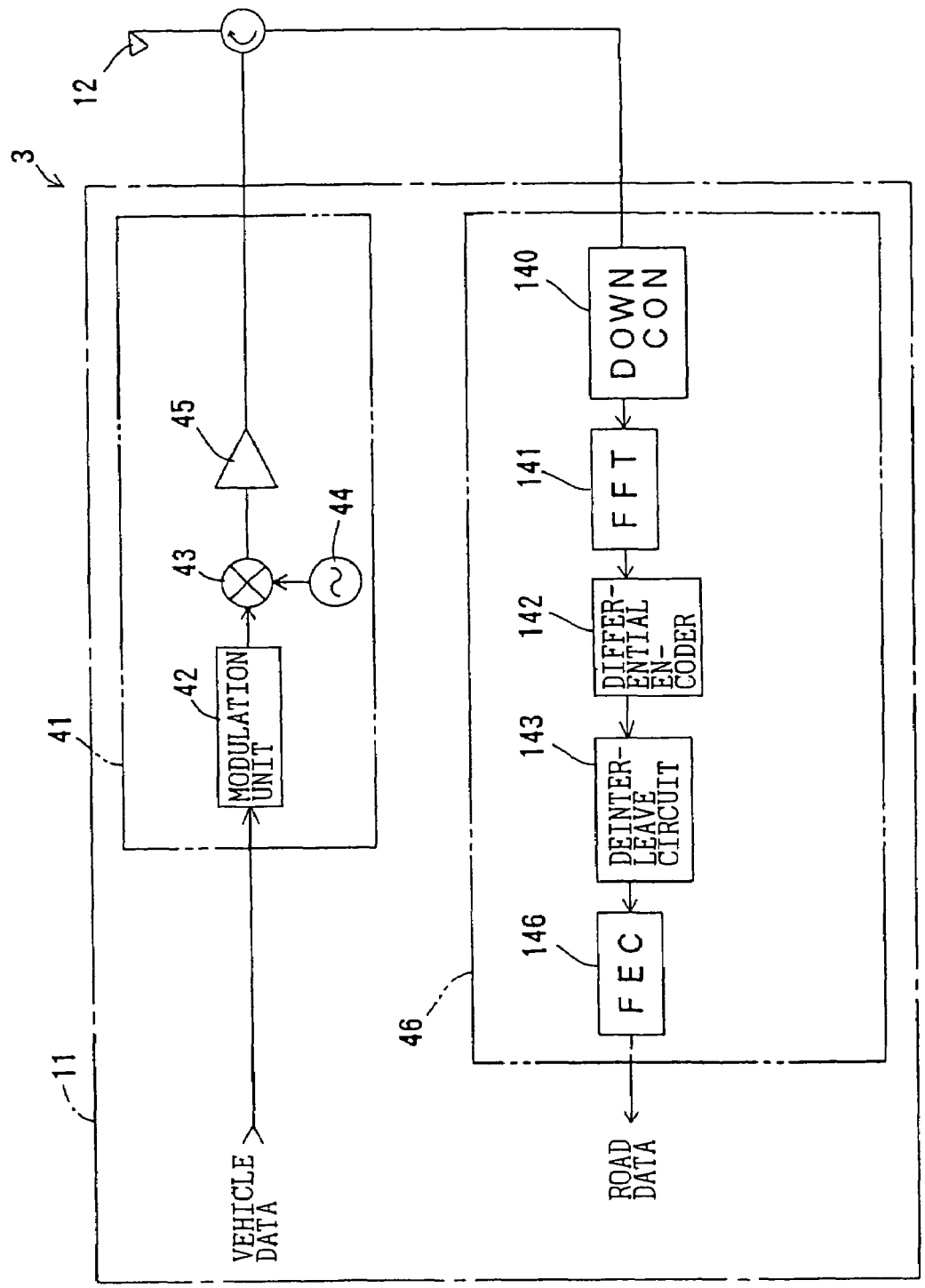
FIG. 23 is a block diagram illustrating another exemplary electrical configuration of the vehicle mounted device.

FIG. 23 is a block diagram illustrating a configuration of the reception unit for receiving the radiations from the road antennas 4a, 4b via the vehicle antenna 12.

The reception unit includes a down-converter 140, a Fourier function transformer 141, a differential decoder 142, a deinterleave circuit 143, and a forward error correction decoder 146.

The Fourier function transformer 141 operates inversely of the inverse Fourier function transformer 133 on the send side. The circuit generates a decoded signal by subjecting the received waves to Fourier transform based on a window length of the effective symbol period TS.

The differential decoder 142 and the deinterleave circuit 143 operate inversely of the differential encoder 132 and the interleave circuit 131, respectively.

The forward error correction decoder 146 operates inversely of the forward error correction encoder 130.

As mentioned supra, the fifth embodiment provides a single cell E with two propagation paths for the waves radiated from the road antenna 4. Therefore, the wave blocking is prevented even when the vehicle 2 is traveling near the large vehicle such as a truck. In addition, the effect of multipath interference may be obviated by virtue of OFDM technique which provides the guard time to avoid the inter-symbol interference. As a result, the seamless communications take place in a preferable manner between the vehicle mounted device 3 and the road antenna 4.

Figure 24:
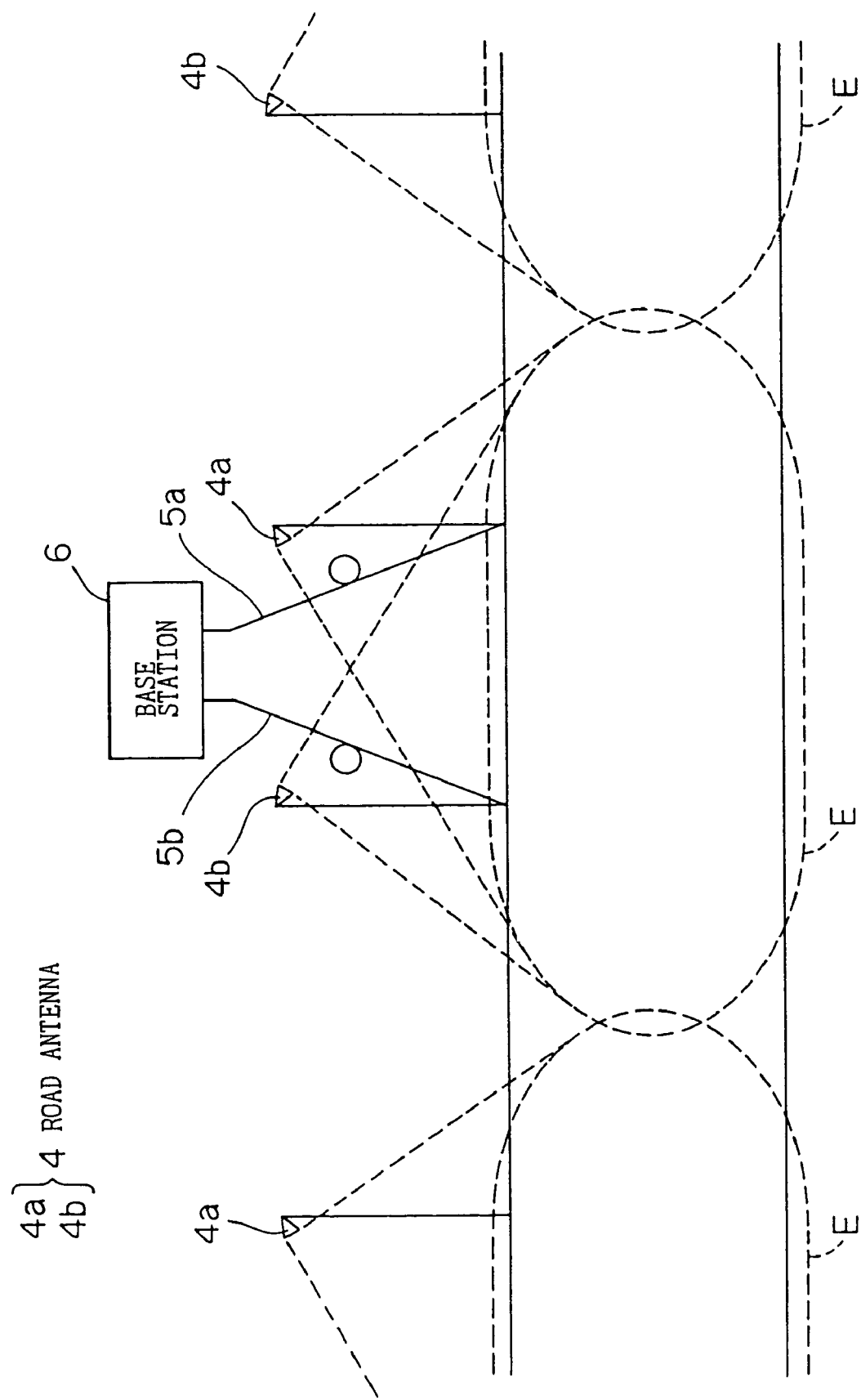
FIG. 24 is a diagram illustrating another exemplary road antenna installation.

According to the foregoing description, the pair of road antennas 4a, 4b forming a single cell E are disposed at longitudinal opposite ends of each cell area with respect to road defined with the cell E. However, the locations of the road antennas 4a, 4b are not limited to the area ends. As shown in FIG. 24 for instance, the antennas may be located at places rather closer to the midportion of the cell E than at the area ends. In the foregoing description, a single cell E is formed by a pair of road antennas 4a, 4b but may be formed by three or more road antennas. Briefly, the road antennas 4 may be varied in the location and the number so long as they are capable of applying the waves to the vehicle 2 in different incoming directions.

According to the foregoing description, the road antennas 4a, 4b employs the optical fiber radio signal transmission system and directly converts the reception signals to the optical signals, dispensing with the frequency conversion. Alternatively, the road antennas 4a, 4b may take procedure such that the reception signals are down-converted to inter-mediate-frequency signals and then converted to the optical signals to be outputted to the optical fibers 5a, 5b. This procedure permits the use of a less costly, commonly used laser diode as the light source for the optical signal, thus contributing to cost reduction.

If, in this case, the system is used wherein the base station 6 outputs a local oscillation signal to the road antennas 4a, 4b (see, for example, Japanese Unexamined Patent Publication No.6-141361 (1994)), the reception signals converted in the road antennas 4a, 4b may substantially be matched in frequency.

SIXTH EMBODIMENT (Sub-area)

Figure 25:
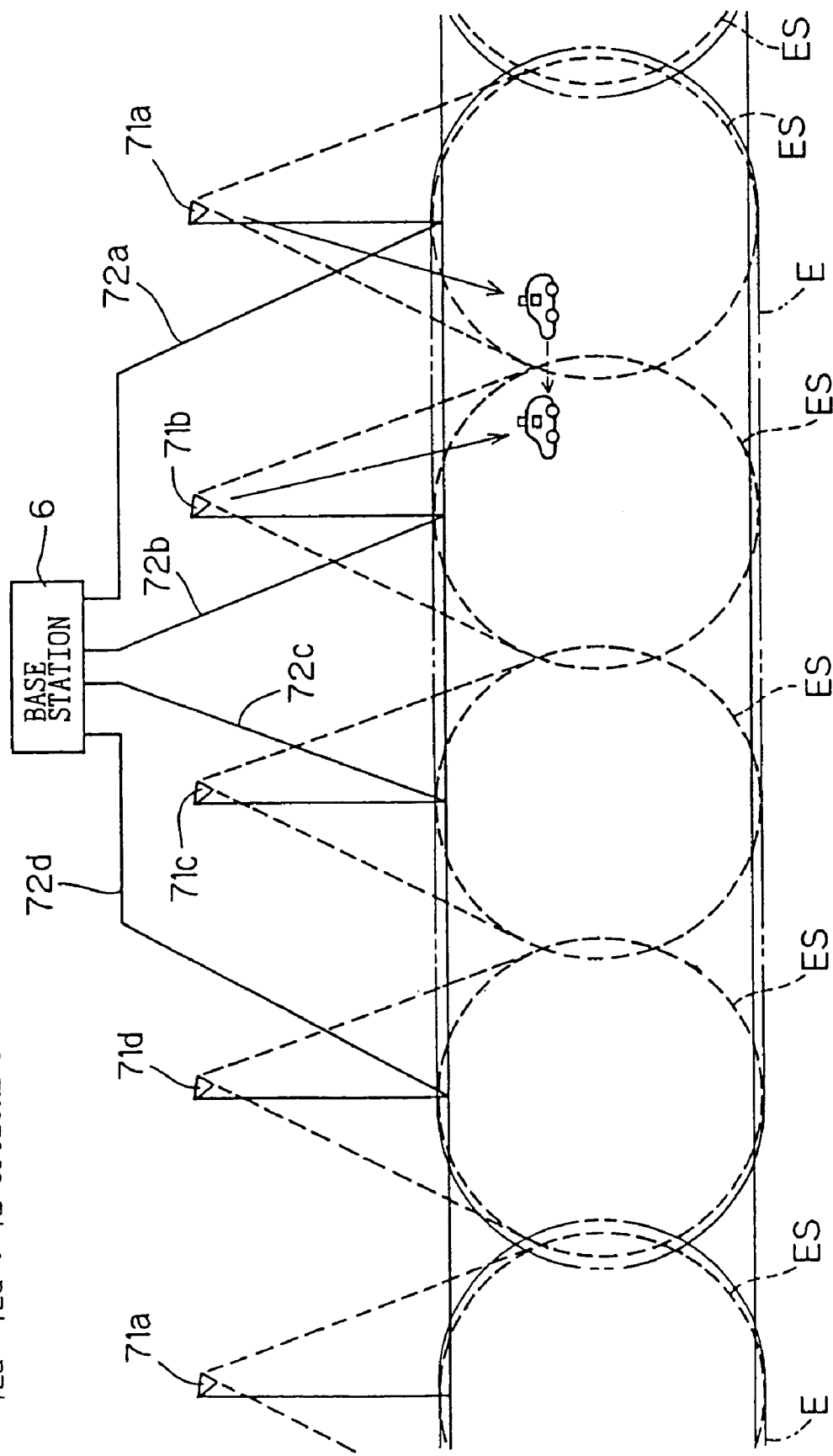
FIG. 25 is a conceptual representation of an exemplary arrangement of the roadway system according to a sixth embodiment hereof.

FIG. 25 is a conceptual representation of an arrangement of the roadway communication system according to a sixth embodiment of the invention. In the sixth embodiment, like functional portions to those in FIG. 1 are represented by like reference characters, respectively.

Although the first to fifth embodiments use a pair of road antennas 4a, 4b to define a single cell E for prevention of the wave blocking, the sixth embodiment is designed to obviate the wave blocking by installing a plurality of road antennas 71 in a cell E radiated with the waves of the same frequency. That is, the cell E is divided into plural sub-areas Es.

More specifically, one base station 6 is connected with four road antennas 71a, 71b, 71c, 71d via optical fibers 72a, 72b, 72c, 72d (hereinafter, collectively referred to as "optical fiber 72"). The road antennas 71a-71d each radiate the sub-areas ES with waves at the same frequency modulated by using the road traffic data of the same content.

In a case, for example, where the vehicle is at position downstream of a midportion of the sub-area while a truck running in the next lane is at position diagonally rearward of the vehicle, the waves may be blocked by the truck. However, when the vehicle in this positional relation with the truck enters the next sub-area Es, the waves are incident in a different direction or the vehicle receives incoming waves from front. Therefore, the vehicle mounted device 3 is allowed to receive the radiation to the next sub-area Es despite the truck running diagonally rearward of the vehicle. That is, the vehicle mounted device 3 is allowed to receive any of the radiations from the road antennas 71 during the passage through the four sub-areas Es.

When the vehicle is crossing a boundary between the sub-areas Es, the waves of the same frequency are incident upon the vehicle from front and back. However, no particular trouble occurs because the vehicle mounted device takes advantage of the diversity reception, selectively processing the reception signal of the maximum reception level. Besides, the effect of multipath interference can be obviated by using the OFDM modulation technique which prevents the inter-symbol interference by providing the guard time.

Figure 26:
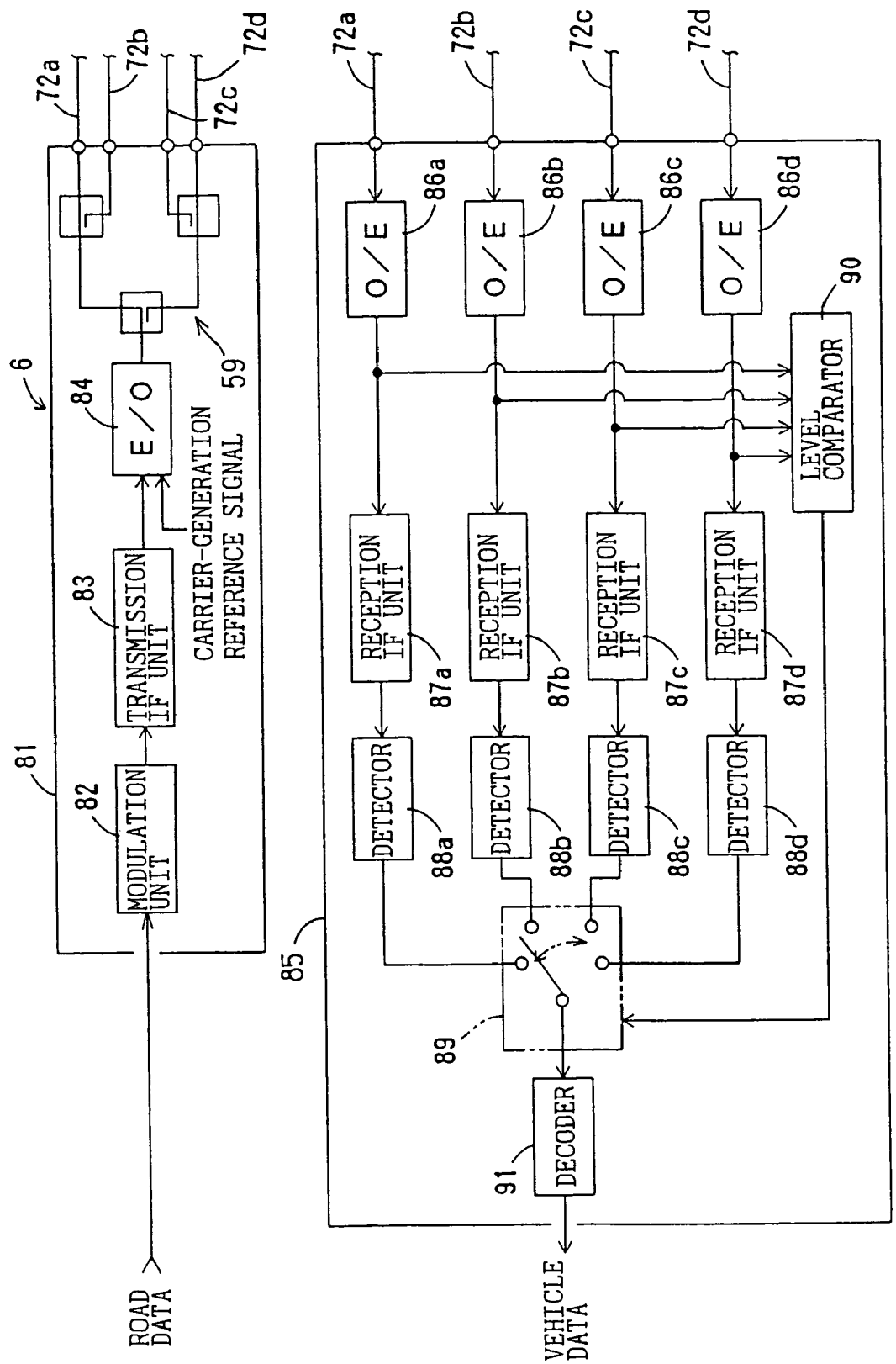
FIG. 26 is a block diagram illustrating an exemplary configuration of the base station.

FIG. 26 is a block diagram illustrating an electrical configuration of the base station 6. The base station 6 includes a transmission unit 81 having a modulation unit 82 in which a transmission signal containing the road traffic data is generated. The transmission signal is applied to a transmission IF unit 83 and then to an electro-optical converter (E/O) 84 where it is combined with a carrier-generation reference signal for conversion to an optical signal. The resultant optical signal is distributed by the optical fiber coupler 59 to be outputted to the up-cables 72a-72d.

A reception unit 85 of the base station 6 includes electro-optical converters (E/O) 86a, 86b, 86d, 86d for converting optical signals to reception signals, the optical signals being sent from the road antennas 71a-71d via the optical fibers 72a-72d, respectively. The reception signals are subjected to processings such as amplification in respective reception IF units 87a, 87b, 87c, 87d. Subsequently, the reception signals are applied to respective detectors 88a, 88b, 88c, 88d for demodulation. Then, the resultant reception signals are supplied to a switch unit 89. The signals are also supplied to a level comparator 90 which compares the reception levels of the reception signals to determine which of the signals has the highest reception level. Then, the comparator provides control of the switch unit 89 for passage of a reception signal of the maximum reception level. The reception signal through the switch unit 89 is decoded by a decoder 91. Thus is generated a decoded signal corresponding to the vehicle data.

In the configuration shown in the block diagram of FIG. 26, the plural signals are switched by the switch unit 89. However, the signals may be weighted with a predetermined weighting factor and then combined together. In this case, "the predetermined weighting factor" is determined based on the reception levels of the reception signals compared by the level comparator 90.

In the block diagram 26, the signals detected by the detectors 88a-88d are switched by the switch unit 89. An alternative configuration is possible wherein IF signals provided by the electro-optical converters (E/I) 86a-86d are switched or combined together. Otherwise, decoded data from the decoder 91 may be switched or combined together.

Figure 27:
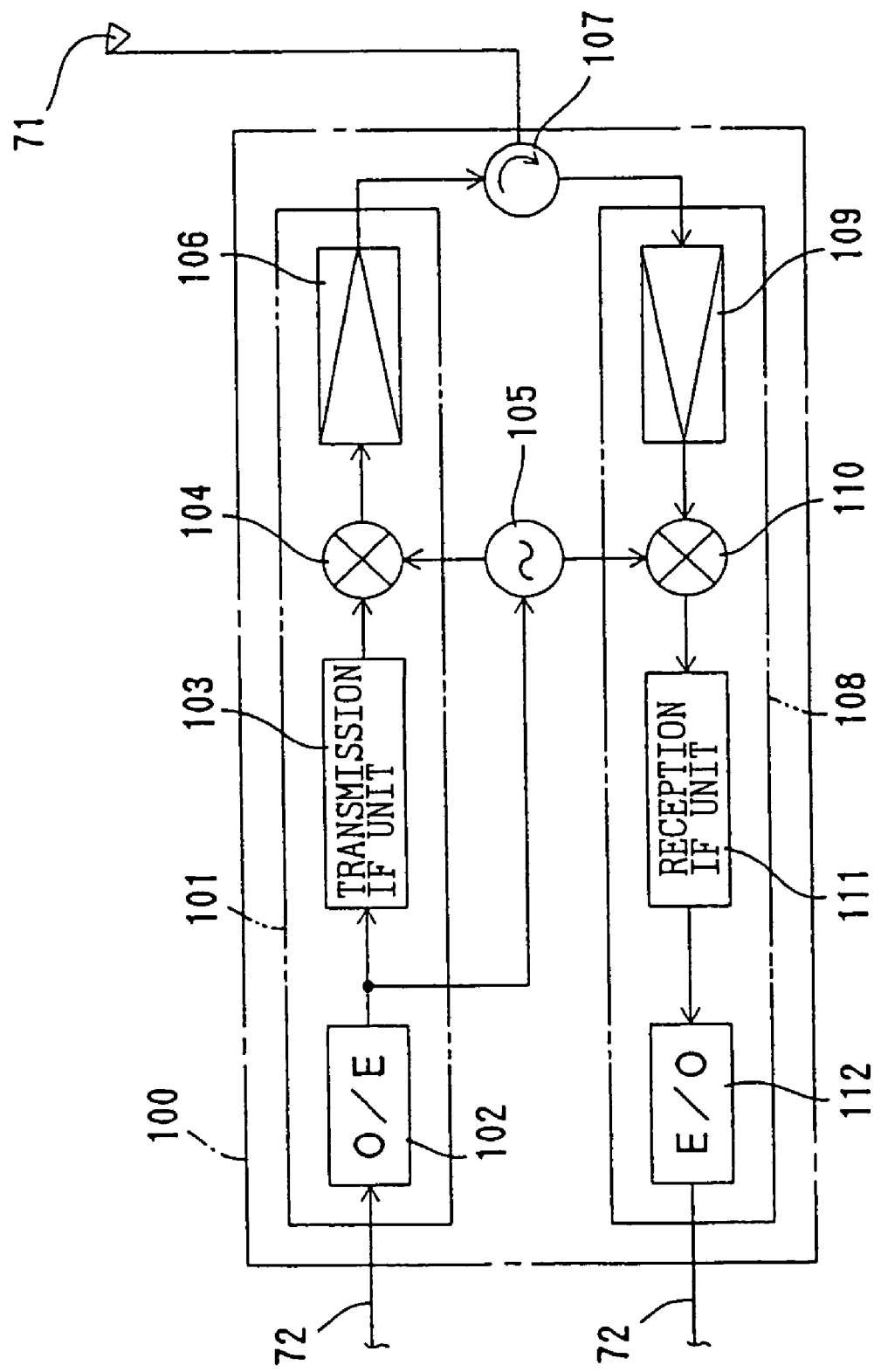
FIG. 27 is a block diagram illustrating an exemplary electrical configuration of the road antenna.
Figure 28:
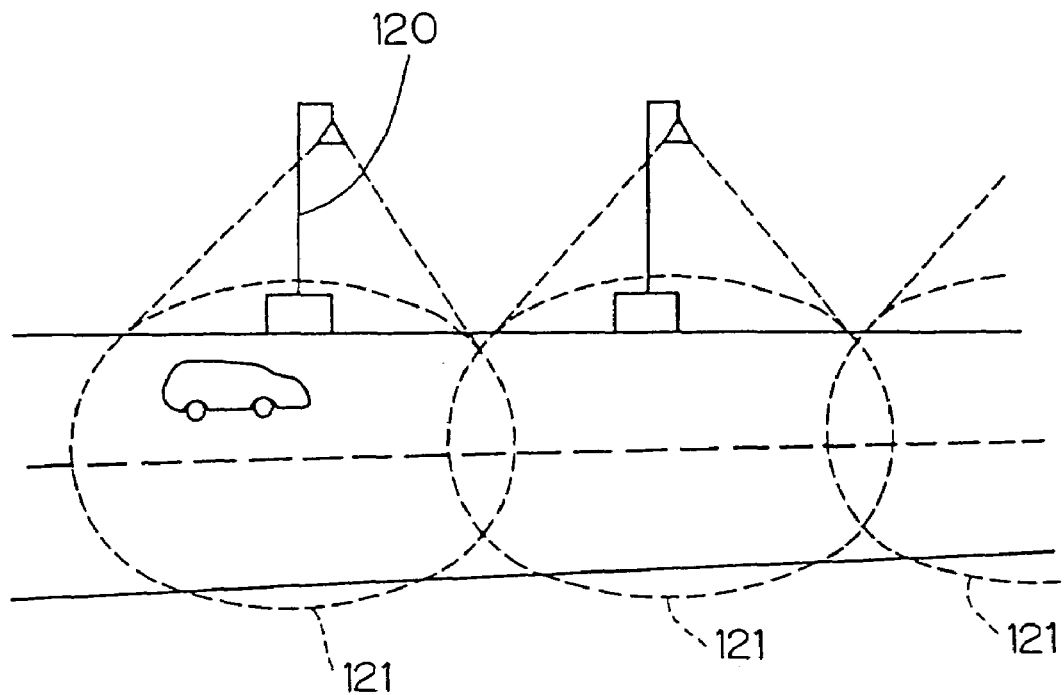
FIG. 28 is a conceptual representation of an arrangement of a conventional roadway communication system.
Figure 29:
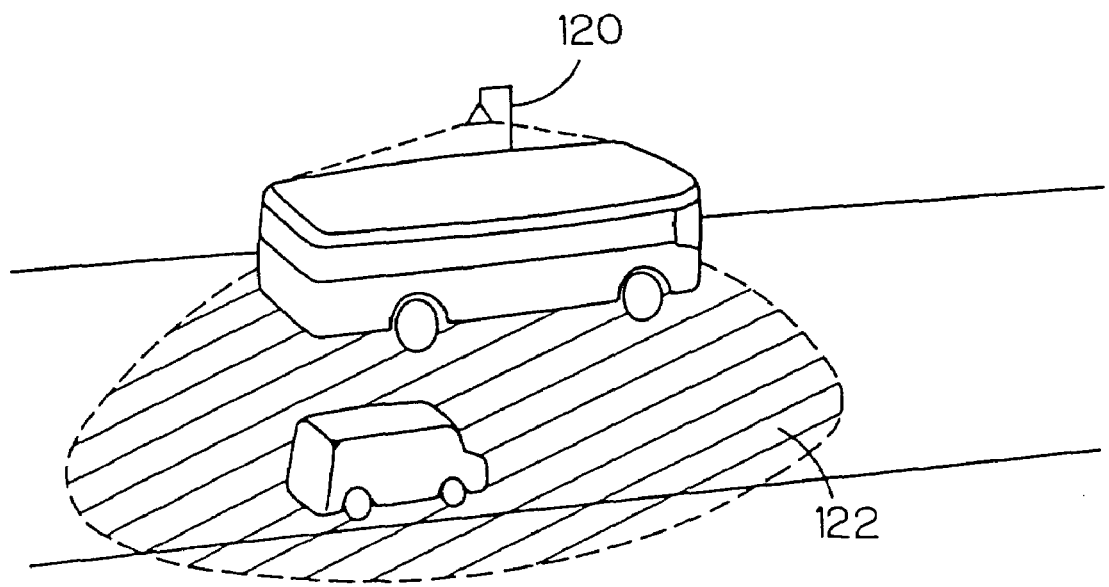
FIG. 29 is a diagram explanatory of wave blocking in the conventional roadway communication system.

FIG. 27 is a block diagram illustrating an electrical configuration of the road antenna 71, to which an antenna communication assembly 100 is mounted. The antenna communication assembly 100 includes a transmission unit 101 having an optic-electrical converter (O/E) 102 which converts an optical signal to a transmission signal and a carrier-generation reference signal, the optical signal sent from the base station 6 via the optical fiber 72. An output from the optic-electrical converter (O/E) 102 is sent to a transmission IF unit 102 via an unillustrated bandpass filter, so that the transmission IF unit 103 receives the transmission signal alone. After amplified by the transmission IF unit 103, the transmission signal is supplied to a transmission mixer 104. The output from the optic-electrical converter (O/E) 102 is also supplied to a local oscillator 105 via an unillustrated lowpass filter, so that the local oscillator 105 receives the carrier-generation reference signal alone. The local oscillator 105 outputs a carrier based on the carrier signal thereby to supply the carrier to the transmission mixer 104. The transmission mixer 104, in turn, combines the transmission signal and the carrier together to generate a radio transmission signal. The radio transmission signal is supplied to a high-frequency amplifier 106 where it is subject to frequency up-amplification before supplied to the road antenna 71 via a circulator 107. Thus, the resultant transmission waves are radiated from the road antenna 71.

The antenna communication assembly 100 also includes a reception unit 108. The reception unit 108 includes a high-frequency amplifier 109 for up-amplifying a reception signal which is received by the road antenna 71 and sent via the circulator 107. The amplified signal is supplied to a reception mixer 110 where it is combined with the carrier from the local oscillator 105 for amplification. Subsequently, the resultant signal is applied to a reception IF unit 111 for frequency conversion. Then, the signal is converted to an optical signal by an electro-optical converter (E/O) 112 before outputted to the optical fiber 72.

According to the sixth embodiment, the vehicle mounted device 3 is allowed to receive the radiation in any of the sub-areas Es because the electromagnetic waves of the same frequency, which are OFDM modulated with the road traffic data of the same content, are divided for radiation to the plural sub-areas Es. This ensures the seamless communications between the vehicle mounted device 3 and the road antenna 71 in a single cell E.

Because of a relatively small size of the sub-area Es, the road antenna 71 requires a small transmission power. This reduces cost for the road antenna 71.

What is claimed is:

1. A roadway communication system comprising a plurality of road transmission antennas, and a vehicle mounted device receiving electromagnetic waves radiated from the road transmission antennas,
   wherein the road transmission antennas are disposed at different places along a road and each radiate the same cell with OFDM (Orthogonal Frequency Division Multiplex)—modulated wave containing the same content,
   wherein the vehicle mounted device comprises a vehicle reception antenna for receiving the waves radiated from the road transmission antennas, and reception means for demodulating the waves received by the vehicle reception antenna.

2. The roadway communication system of claim 1, further comprising a signal transmission unit for transmitting signals modulated with data of the same content through a plurality of transmission lines to the road transmission antennas, wherein an optical fiber radio signal transmission system is used as a transmission system for outputting the signals to the transmission lines.

3. The roadway communication system of claim 1 or 2, wherein orthogonal Frequency Division Multiplex (OFDM) modulation technique in which a guard time is provided at each symbol is used as a data modulation technique.

4. A roadway communication system comprising a vehicle mounted device, and a plurality of road reception antennas receiving electromagnetic waves radiated from the vehicle mounted device,
   wherein the vehicle mounted device comprises a vehicle transmission antenna for radiating waves which are OFDM (Orthogonal Frequency Division Multiplex)—modulated with vehicle data, and wherein the plural road reception antennas are disposed at different places along a road as providing directivity to the same cell and each include road reception means for performing demodulation using a signal received by the road reception antenna.

5. The roadway communication system of claim 4, wherein the road reception antenna uses an optical fiber radio signal transmission system for outputting the received signal to a transmission line to the road reception means.

6. The roadway communication system of claim 4, wherein the vehicle mounted device uses OFDM modulation technique, as a data modulation technique, in which a guard time is provided at each symbol.

\* \* \* \* \*